United States Patent
Yadav et al.

(10) Patent No.: US 12,105,600 B1
(45) Date of Patent: Oct. 1, 2024

(54) LEVERAGING FILE-SYSTEM BLOCK CLONING FOR EFFICIENT FILE-BASED BACKUP AND RECOVERY OPERATIONS

(71) Applicant: Dell Products L.P., Round Rock, TX (US)

(72) Inventors: Sunil Yadav, Bangalore (IN); Shelesh Chopra, Bangalore (IN)

(73) Assignee: Dell Products, L.P., Round Rock, TX (US)

(*) Notice: Subject to any disclaimer, the term of this patent is extended or adjusted under 35 U.S.C. 154(b) by 0 days.

(21) Appl. No.: 18/482,150

(22) Filed: Oct. 6, 2023

(51) Int. Cl.
*G06F 16/00* (2019.01)
*G06F 11/14* (2006.01)
*G06F 16/11* (2019.01)
*G06F 16/14* (2019.01)

(52) U.S. Cl.
CPC ...... *G06F 11/1461* (2013.01); *G06F 11/1469* (2013.01); *G06F 16/122* (2019.01); *G06F 16/148* (2019.01); *G06F 2201/84* (2013.01)

(58) Field of Classification Search
CPC ... G06F 16/122; G06F 16/148; G06F 11/1461
USPC ......................................................... 707/654
See application file for complete search history.

(56) References Cited

U.S. PATENT DOCUMENTS

2024/0028720 A1* 1/2024 Luniya .................. G06F 21/565

* cited by examiner

*Primary Examiner* — Chelcie L Daye
(74) *Attorney, Agent, or Firm* — Chamberlain, Hrdlicka, White, Williams & Aughtry; Aly Z. Dossa

(57) ABSTRACT

A method for efficient file-based backups and recoveries. The method includes: receiving, to initiate a backup session, a file-system backup instruction identifying a host file-system; obtaining at least one clone logical cluster number (LCN) corresponding to a file managed by the host file-system, and a region LCN corresponding to a file region of the file; based on a determination that the region LCN matches a clone LCN of the at least one clone LCN: querying a cluster-offset tracking data structure using the region LCN to identify a cluster-offset tracking entry including the region LCN and a container offset; writing, as a session metadata record stored in backup session metadata for the backup session, file metadata describing the file and including the container offset; and transmitting, to a backup target, an information tuple including a backup session identifier generated for the backup session, and the backup session metadata.

20 Claims, 14 Drawing Sheets

LEVERAGING FILE-SYSTEM BLOCK CLONING FOR EFFICIENT FILE-BASED BACKUP AND RECOVERY OPERATIONS

BACKGROUND

Across any enterprise information technology (IT) environment, applications operating (as well as users executing workloads) thereon often unknowingly create duplicated data. Said duplicated data may take form as entire files or any number of file regions thereof. Concerning any conventional backup, which entails any files at least in part reflecting duplicated data, the agent responsible for conducting said backup must read and write each file of any said files independently.

SUMMARY

In general, in one aspect, embodiments described herein relate to a method for efficient file-based backups and recoveries. The method includes: receiving, to initiate a backup session, a file-system backup instruction identifying a host file-system; obtaining at least one clone logical cluster number (LCN) corresponding to a file managed by the host file-system, and a region LCN corresponding to a file region of the file; based on a determination that the region LCN matches a clone LCN of the at least one clone LCN: querying a cluster-offset tracking data structure using the region LCN to identify a cluster-offset tracking entry including the region LCN and a container offset; writing, as a session metadata record stored in backup session metadata for the backup session, file metadata describing the file and including the container offset; and transmitting, to a backup target, an information tuple including a backup session identifier generated for the backup session, and the backup session metadata.

In general, in one aspect, embodiments described herein relate to a non-transitory computer readable medium (CRM). The non-transitory CRM includes computer readable program code, which when executed by a computer processor, enables the computer processor to perform a method for efficient file-based backups and recoveries. The method includes: receiving, to initiate a backup session, a file-system backup instruction identifying a host file-system; obtaining at least one clone logical cluster number (LCN) corresponding to a file managed by the host file-system, and a region LCN corresponding to a file region of the file; based on a determination that the region LCN matches a clone LCN of the at least one clone LCN: querying a cluster-offset tracking data structure using the region LCN to identify a cluster-offset tracking entry including the region LCN and a container offset; writing, as a session metadata record stored in backup session metadata for the backup session, file metadata describing the file and including the container offset; and transmitting, to a backup target, an information tuple including a backup session identifier generated for the backup session, and the backup session metadata.

In general, in one aspect, embodiments described herein relate to a system. The system includes: a backup target; and a host device operatively connected to the backup target, and including: host storage configured to store data mapped to files; a computer processor operatively connected to the host storage; and a host file-system operating on the computer processor and configured to manage the files, wherein the computer processor is configured to perform a method for efficient file-based backups and recoveries. The method includes: receiving, to initiate a backup session, a file-system backup instruction identifying the host file-system; obtaining at least one clone logical cluster number (LCN) corresponding to a file of the files managed by the host file-system, and a region LCN corresponding to a file region of the file; based on a determination that the region LCN matches a clone LCN of the at least one clone LCN: querying a cluster-offset tracking data structure using the region LCN to identify a cluster-offset tracking entry including the region LCN and a container offset; writing, as a session metadata record stored in backup session metadata for the backup session, file metadata describing the file and including the container offset; and transmitting, to the backup target, an information tuple including a backup session identifier generated for the backup session, and the backup session metadata.

Other aspects of the embodiments described herein will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of the embodiments by way of example and are not meant to limit the scope of the claims.

DETAILED DESCRIPTION

Figure 1:
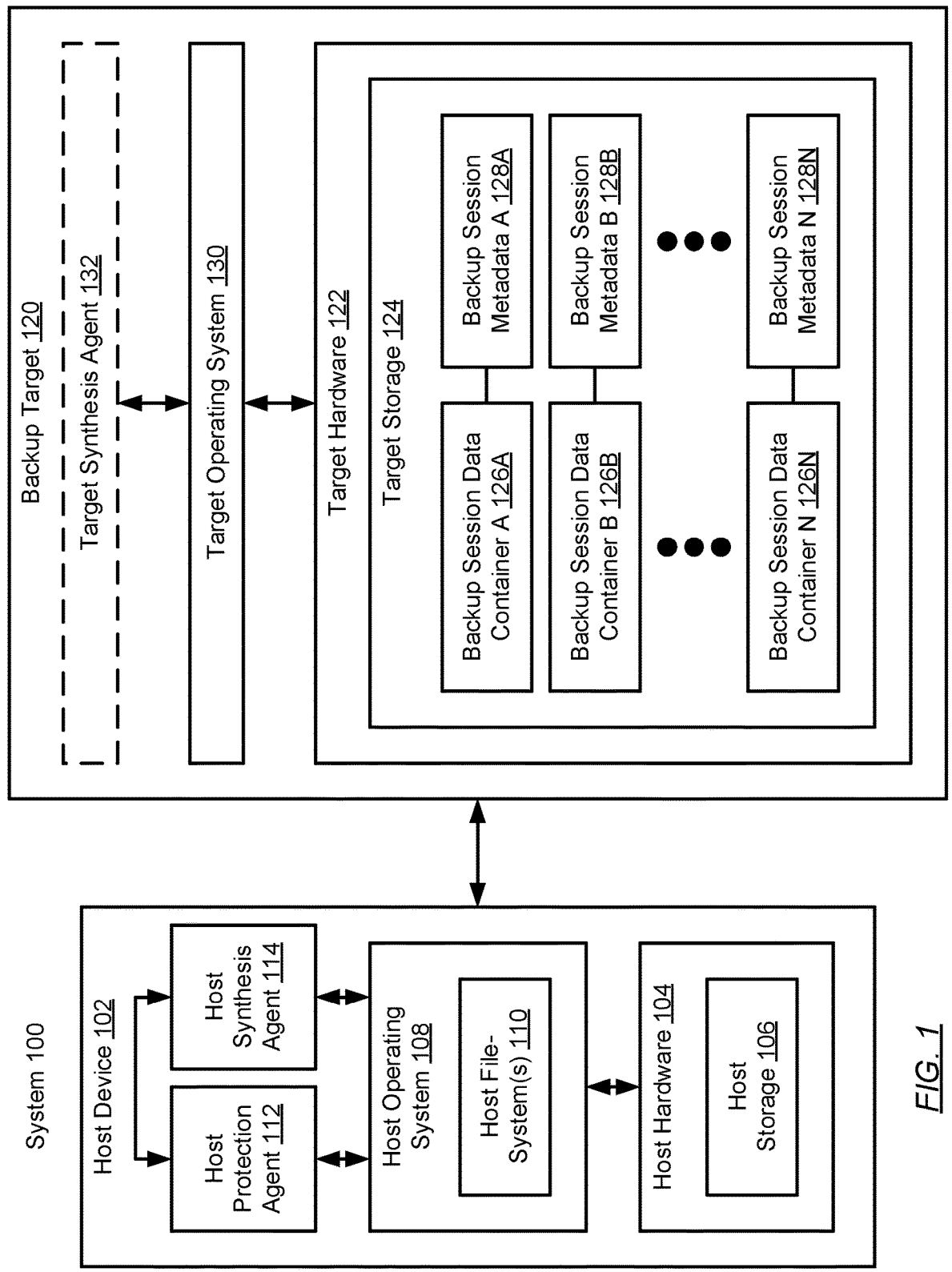
FIG. 1 shows a system in accordance with one or more embodiments described herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to leveraging file-system block cloning for efficient file-based backup and recovery operations. Particularly, when a file-system undergoes a backup using a file-based technique, an agent responsible for performing said backup executes read and write operations on every file managed by said file-system. These read operations tend to generate multiple input-output (IO) transactions depending on the size of said file-system, or the number of files managed thereby. Further, across any enterprise information technology (IT) environment, applications operating (as well as users executing workloads) thereon often unknowingly create duplicated data. Said duplicated data may take form as entire files or any number of file regions thereof. Concerning any conventional backup, which entails any files at least in part reflecting duplicated data, the agent responsible for conducting said backup must read and write each file of any said files independently. Conventional backups, therefore, increase: the compute load on enterprise IT hosts; the backup completion time; the consumption of enterprise IT host resources; network utilization; and the consumption of storage space on a backup target maintaining any backed up files.

Embodiments described herein, accordingly, implement a solution addressing the above-mentioned issue(s) by employing file-system block cloning capabilities to efficiently conduct file-based backup and recovery operations. Said block cloning capabilities rely on low-cost metadata operations that convert expensive, physical IO operations (e.g., reads and/or writes) to quick and logical equivalents. This allows backup and recovery operations to complete faster and generate less IO transactions directed to the underlying storage on any enterprise IT host and/or any backup target. In turn, these benefits result in the reduction of resource (e.g., compute processing, network bandwidth, backup target storage utilization, etc.) consumption.

FIG. 1 shows a system in accordance with one or more embodiments described herein. The system (100) may include a host device (102) and a backup target (120). Each of these system (100) components is described below.

In one or many embodiment(s) described herein, the host device (102) may represent any physical appliance at least configured to receive, generate, process, store, and/or transmit data, as well as to provide an environment in which one or many computer program(s) may execute thereon. The computer program(s) may, for example, implement large-scale and complex data processing; or implement one or more services, such as data protection services, offered locally or over a network (not shown). Further, in providing said execution environment for any computer program(s) installed thereon, the host device (102) may include and allocate various resources (e.g., computer processors, memory, storage, virtualization, network bandwidth, etc.), as needed, to the computer program(s) and/or any tasks (or processes) instantiated thereby. One of ordinary skill, however, will appreciate that the host device (102) may perform other functionalities without departing from the scope of the embodiments described herein. Examples of the host device (102) may include, but are not limited to, a desktop computer, a laptop computer, a network server, a smartphone, a tablet computer, or any other computing system similar to the exemplary computing system illustrated and described with respect to FIG. 4, below.

In one or many embodiment(s) described herein, the host device (102) may, at least in part, include host hardware (104), a host operating system (108), a host protection agent (112), and a host synthesis agent (114). Each of these host device (102) subcomponents is described below.

In one or many embodiment(s) described herein, the host hardware (104) may refer to physical resources natively available to, or physically installed on, the host device (102). The host hardware (104) may include, but is not limited to: compute resources (i.e., any number of integrated circuits configured to process computer readable instructions—e.g., one or more central processing units (CPU) or the like, also collectively referred to herein as computer processor(s)); memory resources (i.e., any number of non-volatile and/or volatile memory devices); storage resources, also referred to herein as host storage (106) (described below); networking resources (i.e., any number of integrated circuits configured to receive and transmit data over any network fabric—e.g., network adapter(s), network interface(s), etc.); and accelerated compute resources (i.e., any number of specialized integrated circuits configured to speed up and process demanding workloads through the use of parallel processing and/or artificial intelligence—e.g., graphics processing units (GPU), data processing units (DPU), tensor processor units (TPU), vision processing units (VPU), etc.).

In one or many embodiment(s) described herein, host storage (106) may refer to a collection of one or more physical storage devices (not shown) on which various forms of digital information—e.g., application, user, and/or service data and metadata—may be maintained. Each physical storage device may encompass non-transitory computer readable storage media on which said digital information may be stored in whole or in part, and temporarily or permanently. Further, host storage (106), at least in part, may be implemented using persistent (i.e., non-volatile) storage. Examples of persistent storage may include, but are not limited to, optical storage, magnetic storage, solid state storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

In one or many embodiment(s) described herein, the host operating system (108) may refer to a computer program that may execute on the underlying hardware (i.e., at least a portion of the host hardware (104)) of the host device (102), which may be responsible for overseeing host device (102) operations. To that end, and at least in part, the host operating system (108) may include functionality to: support fundamental host device (102) functions; schedule tasks; mediate interactivity between logical (i.e., software) and physical (i.e., hardware) host device (102) subcomponents; allocate host device (102) resources as needed; and execute or invoke other computer programs (e.g., host protection agent (112), host synthesis agent (114), etc.) executing on the host device (102). One of ordinary skill, however, will appreciate that the host operating system (108) may perform other functionalities without departing from the scope of the embodiments described herein.

For example, in one or many embodiment(s) described herein, the host operating system (108) may facilitate access and interaction with locally stored information (e.g., application, user, and/or service data and metadata) by the other computer program(s) executing on the host device (102). In facilitating said access and interaction, the host operating system (108) may implement one or more host file-systems (110). Any host file-system (110) may refer to a physical file system (or file-system implementation), which may reference a collection of subroutines concerned with the physical operation of one or many physical storage devices(s) (not shown). Any host file-system (110), in this respect, may be concerned with the physical operation of at least a subset of the host storage (106). Accordingly, any host file-system (110) may host storage (106) device drivers (or firmware) to process requested file operations from the other computer program(s). Device drivers enable any host file-system (110) to manipulate physical storage, in the form of disk blocks and/or file regions for example, as appropriate.

In one or many embodiment(s) described herein, the host protection agent (112) may refer to a computer program that may execute on the underlying hardware (i.e., at least a portion of the host hardware (104)) of the host device (102), which may be responsible for facilitating backup and recovery operations entailing any granularity of information (e.g., application, user, and/or service data and metadata) stored/maintained locally on the host device (102). To that end, and at least in part, the host protection agent (112) may include functionality to: protect said information against data loss (i.e., through backup operations); and reconstruct said information following such data loss (i.e., through recovery operations). One of ordinary skill, however, will appreciate that the host protection agent (112) may perform other functionalities without departing from the scope of the embodiments described herein.

In one or many embodiment(s) described herein, the host synthesis agent (114) may refer to a computer program that may execute on the underlying hardware (i.e., at least a portion of the host hardware (104)) of the host device (102), which may be responsible for facilitating data reconstruction during recovery operations entailing any granularity of information (e.g., application, user, and/or service data and metadata) that had been stored/maintained locally on the host device (102) (or any other host device (not shown)) prior to the loss thereof. One of ordinary skill, however, will appreciate that the host synthesis agent (114) may perform other functionalities without departing from the scope of the embodiments described herein.

In one or many embodiment(s) described herein, the backup target (120) may represent any data backup, archiving, and/or disaster recovery storage system. The backup target (120) may be implemented using one or more storage servers (not shown), which may reside amongst on-premises infrastructure, cloud computing infrastructure, or any hybrid infrastructure thereof. Each storage server may thus encompass a physical network server or a virtual network server. Additionally, or alternatively, the backup target (120) may be implemented using one or more computing systems similar to the exemplary computing system illustrated and described with respect to FIG. 4, below.

In one or many embodiment(s) described herein, the backup target (120) may, at least in part, include target hardware (122), a target operating system (130), and (optionally) a target synthesis agent (132). Each of these backup target (120) subcomponents is described below.

In one or many embodiment(s) described herein, the target hardware (122) may refer to physical resources natively available to, or disaggregated resources provisioned to, the backup target (120). The target hardware (122) may include, but is not limited to: compute resources (i.e., any number of integrated circuits configured to process computer readable instructions—e.g., one or more central processing units (CPU) or the like, also collectively referred to herein as computer processor(s)); memory resources (i.e., any number of non-volatile and/or volatile memory devices); storage resources, also referred to herein as target storage (124) (described below); and networking resources (i.e., any number of integrated circuits configured to receive and transmit data over any network fabric—e.g., network adapter(s), network interface(s), etc.).

In one or many embodiment(s) described herein, target storage (124) may refer to a collection of one or more physical storage devices (not shown) on which various forms of digital information—e.g., application, user, and/or service data and metadata—may be maintained. Each physical storage device may encompass non-transitory computer readable storage media on which said digital information may be stored in whole or in part, and temporarily or permanently. Further, target storage (124), at least in part, may be implemented using persistent (i.e., non-volatile) storage. Examples of persistent storage may include, but are not limited to, optical storage, magnetic storage, solid state storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

In one or many embodiment(s) described herein, the target storage (124) may at least store/maintain tuples of information each pertaining to a particular backup session. Any backup session may reference a process during which a data selection on the host device (102) may be backed up to the backup target (120) as a result of an initiated and completed backup operation. Further, each information tuple may include a backup session identifier (not shown), a backup session data container (e.g., 126A), and backup session metadata (e.g., 128A). The backup session identifier may specify any information that may uniquely identify and reference the backup session associated with the information tuple—e.g., an arbitrary length character string generated for and assigned to the backup session, a time stamp encoding a date and/or time that the backup session completed, etc. The backup session data container (126A-126N), meanwhile, may refer to a container format (or metafile) (e.g., common data stream format (CDSF) container) configured to enable multiple data streams (as well as metadata detailing said data streams) to be embedded into a single file. The aforementioned data streams may include point-in-time backup copies (or snapshots) of one or more file regions respective to a single file, and/or to multiple files, stored/maintained on the host device (102), which may be backed up to the backup target (120) during the backup session associated with the information tuple. The backup session metadata (128A-128N) associated with the backup session, moreover, may refer to information descriptive of the completed backup operation process and/or the backup file region(s) of one or multiple backup file(s) stored/maintained in the backup session data container (126A-126N) associated with the backup session.

In one or many embodiment(s) described herein, the target operating system (130) may refer to a computer program that may execute on the underlying hardware (i.e., at least a portion of the target hardware (122)) of the backup target (120), which may be responsible for overseeing backup target (120) operations. To that end, and at least in part, the target operating system (130) may include functionality to: support fundamental backup target (120) functions; schedule tasks; mediate interactivity between logical (i.e., software) and physical (i.e., hardware) backup target (120) subcomponents; allocate backup target (120) resources as needed; and execute or invoke other computer programs (e.g., target synthesis agent (132), etc.) executing on the backup target (120). One of ordinary skill, however, will appreciate that the target operating system (130) may perform other functionalities without departing from the scope of the embodiments described herein.

In one or many embodiment(s) described herein, the (optional) target synthesis agent (132) may refer to a computer program that may execute on the underlying hardware (i.e., at least a portion of the target hardware (122)) of the backup target (120), which may be responsible for facilitating data reconstruction during backup operations entailing any granularity of information (e.g., application, user, and/or service data and metadata) stored/maintained on the host device (102). One of ordinary skill, however, will appreciate that the (optional) target synthesis agent (132) may perform other functionalities without departing from the scope of the embodiments described herein.

In one or many embodiment(s) described herein, the above-mentioned system (100) components (or subcomponents thereof) may communicate with one another through a network (not shown) (e.g., a local area network (LAN), a wide area network (WAN) such as the Internet, a mobile network, any other network type, or any combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components (or subcomponents thereof). Moreover, in communicating with one another, the above-mentioned system (100) components (or subcomponents thereof) may employ any combination of wired and/or wireless communication protocols.

While FIG. 1 shows a configuration of components and/or subcomponents, other system (100) configurations may be used without departing from the scope of the embodiments described herein.

FIGS. 2A-2F show a flowchart describing a method for leveraging file-system block cloning for efficient file-based backup operations in accordance with one or more embodiments described herein. The various steps outlined below may be performed by the host device (or any subcomponent(s) thereof) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Figure 2A:
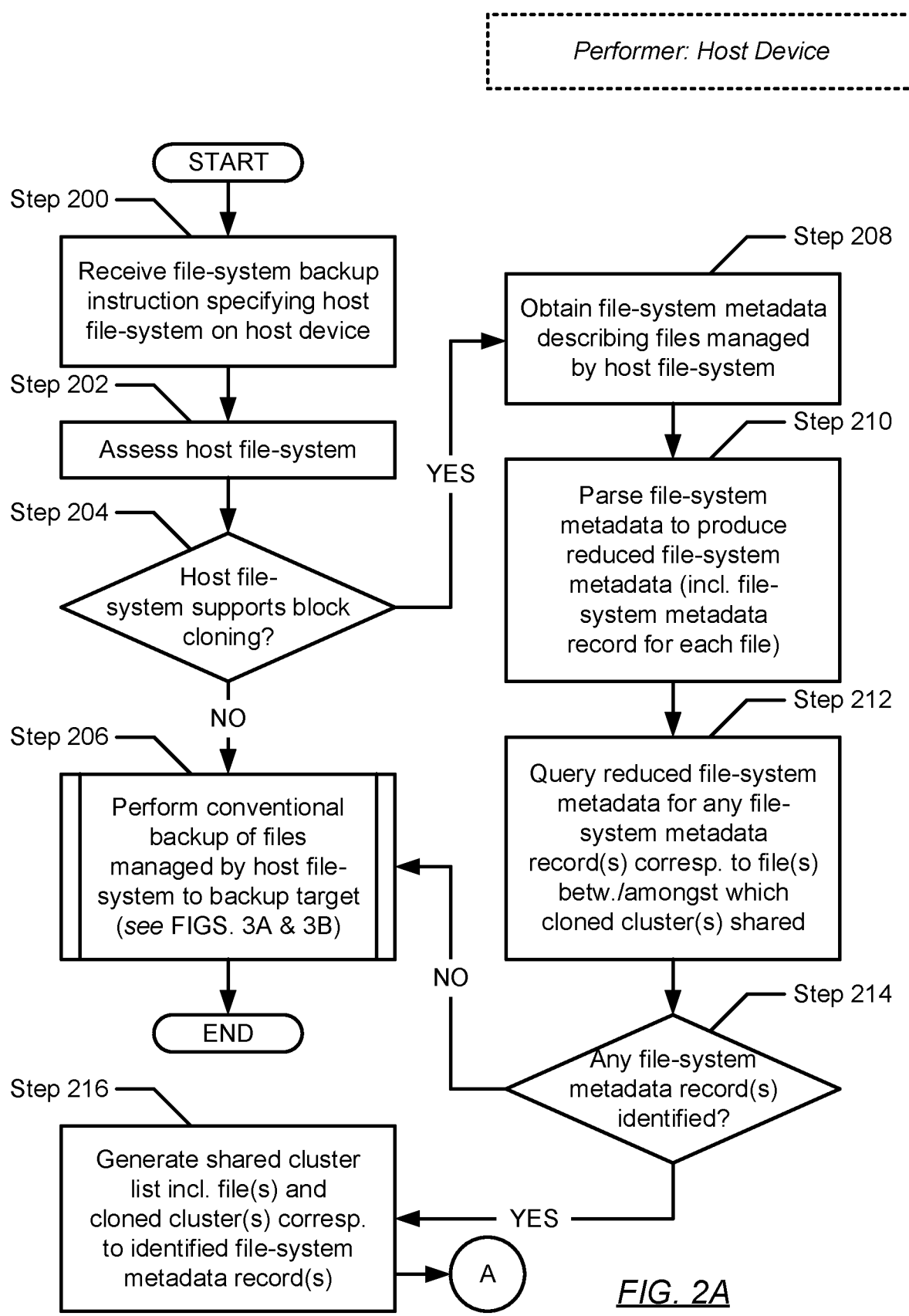
FIGS. 2A-2F show a flowchart describing a method for leveraging file-system block cloning for efficient file-based backup operations in accordance with one or more embodiments described herein.

Turning to FIG. 2A, in Step 200, a file-system backup instruction is received. In one or many embodiment(s) described herein, the file-system backup instruction may include or specify an identifier uniquely identifying a host file-system of the host file-system(s) (see e.g., FIG. 1) operating on the host device. The file-system backup instruction, accordingly, may pertain to a periodic or on-demand request for conducting a backup operation (or a backup session) entailing or targeting a set of files managed by the host file-system.

In Step 202, the host file-system (specified in Step 200) is assessed. In one or many embodiment(s) described herein, assessment of the host file-system may entail ascertaining any feature(s) and/or capabilities offered by the host file-system. One of said feature(s) and/or capabilities that may or may not be supported by the host file-system is block cloning. Block cloning may refer to low-cost metadata operations (versus expensive read and write operations) directed to copying file data. More specifically, through file-systems that support block cloning, multiple files can share and thus map to the same logical clusters (i.e., logical units of file storage corresponding to physical locations on physical storage devices). As such, copy operations performed through block cloning only need to alter the logical cluster mapping for any given file region of a file rather than reading and writing the underlying file region data from a source storage location to a destination storage location. Said remapping, therefore, results in faster data copying and generates less input-output (IO) operations directed to the underlying storage.

In Step 204, based on the host file-system assessment (performed in Step 202), a determination is made as to whether the host file-system (specified in Step 200) supports block cloning (described above). In one or many embodiment(s) described herein, if it is determined that the host file-system does not support block cloning, then the method proceeds to Step 206. On the other hand, in one or many other embodiment(s) described herein, if it is alternatively determined that the host file-system does support block cloning, then the method alternatively proceeds to Step 208.

In Step 206, following the determination (made in Step 204) that the host file-system (specified in Step 200) does not support block cloning, a conventional backup, to the backup target, of the files managed by the host file-system is performed. Said conventional backup is illustrated and described in further detail with respect to FIGS. 3A and 3B, below.

In Step 208, following the alternate determination (made in Step 204) that the host file-system (specified in Step 200) does support block cloning, file-system metadata is obtained. In one or many embodiment(s) described herein, the file-system metadata may reflect information descriptive of each file of the files managed by the host file-system. Examples of file-system metadata, descriptive of any given file, may include: a file identifier and/or a filename associated with the given file; a parent file (or folder) identifier and/or a parent file (or folder) name associated with a parent file-system object of the given file; a file size (expressed in bytes) associated with the given file; at least one logical cluster number (LCN) respectively identifying at least one logical cluster associated with the given file; a creation timestamp encoding a date and/or time on which the given file had been created; a modification timestamp encoding a date and/or time on which the given file had last been modified; any access permissions associated with the given file; and an owner (or user) responsible for creating the given file.

In Step 210, the file-system metadata (obtained in Step 208) is parsed to produce reduced file-system metadata. In one or many embodiment(s) described herein, the reduced file-system metadata may reflect at least a subset of the information describing each file of the files managed by the host file-system. Examples of reduced file-system metadata, descriptive of any given file, may include: a file identifier and/or a filename associated with the given file; and at least one logical cluster number (LCN) respectively identifying at least one logical cluster associated with the given file. Further, the reduced file-system metadata may be organized through a set of file-system metadata records, where said information describing any said given file of files may be maintained in a file-system metadata record in the set of file-system metadata records, respectively.

In Step 212, the reduced file-system metadata (produced in Step 210) is queried for any file-system metadata record(s) matching a query criterion. In one or many embodiment(s) described herein, the query criterion may require the identification of any file(s) amongst and/or between which at least one (same) logical cluster may be shared. That is, for any single file having one or more file regions: (i) said single file may share a logical cluster amongst itself should at least two file regions of said single file reflect the same or duplicate file content; and/or (ii) said single file may share a logical cluster between itself and at least one other single file should at least one file region of said single file, as well as at least one file region of each of the at least one other single file(s), reflect the same or duplicate file content. Further, any shared logical cluster, amongst and/or between one or more files, may also be referred to herein as a cloned cluster.

In Step 214, based on the reduced file-system metadata query (performed in Step 212), a determination is made as to whether any file-system metadata record(s) has/have been identified. In one or many embodiment(s) described herein, if it is determined that at least one file-system metadata record is identified, then the method proceeds to Step 216. On the other hand, in one or many other embodiment(s) described herein, if it is alternatively determined that zero file-system metadata records are identified, then the method alternatively proceeds to Step 206 (described above), where the files managed by the host file-system (specified in Step 200) undergo a conventional backup to the backup target.

In Step 216, following the determination (made in Step 214) that at least one file-system metadata record is identified based on the reduced file-system metadata query (performed in Step 212), a shared cluster list is generated. In one or many embodiment(s) described herein, the shared cluster list may refer to a data structure (e.g., a table) in which file to cloned cluster mappings may be tracked/maintained. The shared cluster list may organize said mappings through one or more shared cluster list entries, where each shared cluster list entry may correspond to a different/distinct file-system metadata record of the at least one identified file-system metadata record. Further, for any identified file-system metadata record, the shared cluster list entry corresponding thereto may include or specify the file identifier and/or filename associated with the file (mapped to the identified file-system metadata record) and one or more (clone) LCNs respectively identifying one or more cloned clusters (i.e., one or more shared logical clusters) (mapped to the file).

Hereinafter, the method proceeds to Step 220 (see e.g., FIG. 2B).

Figure 2B:
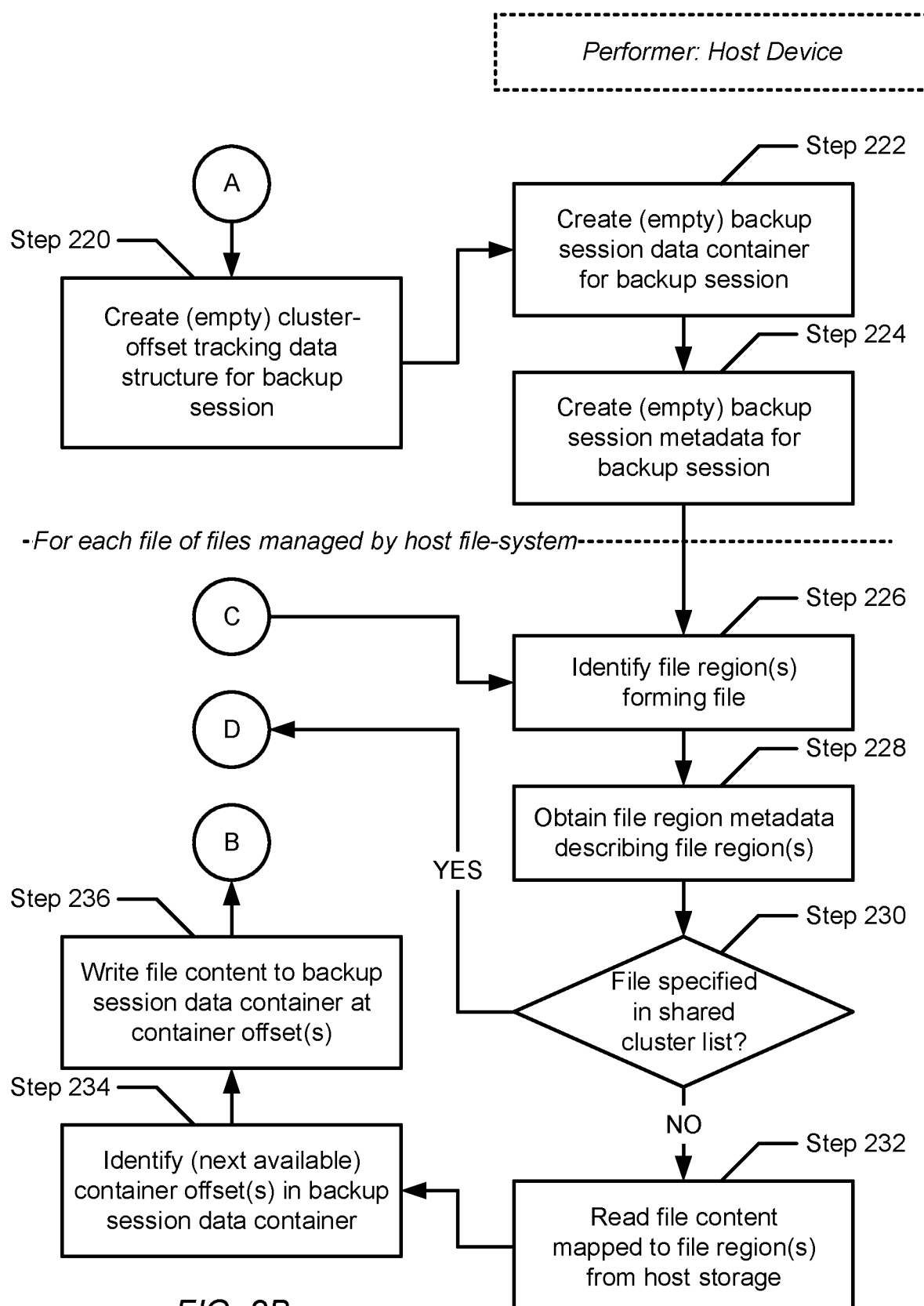

Turning to FIG. 2B, in Step 220, a/an (empty) cluster-offset tracking data structure is created for the backup session initiated by the file-system backup instruction (received in Step 200). In one or many embodiment(s) described herein, the cluster-offset tracking data structure may refer to a data structure (e.g., a table) in which region LCN to container offset mappings may be tracked/maintained. That is, any region LCN (respective to at least a file region of one or more files) may or may not match any clone LCN (mapping to said one or more files). When a region LCN matches a clone LCN, said region LCN (similar to the matched clone LCN) may identify a cloned cluster that not only maps to said one or more files, but also specifically maps to: (i) at least two file regions of a single file, where the at least two said file regions each reflect the same/duplicate file content; and/or (ii) at least one file region replicated across at least two separate files, where the at least one said file region (at least in part forming each of the at least two said separate files) reflects the same/duplicate file content. Furthermore, any file region may generally refer to any portion of a file that alone occupies a single logical cluster.

In one or many embodiment(s) described herein, the cluster-offset tracking data structure, furthermore, may organize said above-mentioned mappings through one or more cluster-offset tracking entries, where each cluster-offset tracking entry may correspond to a different/distinct cloned cluster (i.e., a different/distinct shared logical cluster) specified in the shared cluster list (generated in Step 216). Therefore, for any cloned cluster specified in the shared cluster list, the cluster-offset tracking entry corresponding thereto may include or specify the region LCN (i.e., matching the clone LCN) identifying the cloned cluster (which may be occupied with/by file content mapped to one or more separate file regions of one or more separate files, respectively and/or irrespectively), and a container offset referencing a storage location in a backup session data container (created in Step 222 (described below)) relative to a zero or start storage location thereof, where said storage location may correspond to a preset-sized chunk of container storage space that stores said file content.

In Step 222, a/an (empty) backup session data container is created for the backup session initiated by the file-system backup instruction (received in Step 200). In one or many embodiment(s) described herein, the backup session data container may refer to a container format (or metafile) (e.g., common data stream format (CDSF) container) configured to enable multiple data streams (as well as metadata detailing said data streams) to be embedded into a single file. The aforementioned data streams may include point-in-time backup copies (or snapshots) of one or more file regions respective to a single file, and/or to multiple files, stored/maintained on the host device, which may be backed up to the backup target during the backup session.

In Step 224, a/an (empty) backup session metadata is created for the backup session initiated by the file-system backup instruction (received in Step 200). In one or many embodiment(s) described herein, the backup session metadata may refer to information descriptive of the completed backup operation process and/or the backup file region(s) of one or multiple backup file(s) stored/maintained in the backup session data container (created in Step 222 and populated in Step 236, 260, or 278).

Note: a portion of the remaining steps (i.e., Steps 226, 228, 230, 232, 234, 236, 240, 242, 250, 252, 254, 256, 258, 260, 264, 266, 268, 270, 272, 274, 276, 278, 280, 284, and 286) presented and described hereinafter are pertinent to, and thus performed for, each file of the files managed by the host file-system (specified in Step 200).

In Step 226, one or more file regions, forming the file, is/are identified. In one or many embodiment(s) described herein, any file region may refer to any portion of the file that alone occupies a single logical cluster. Depending on the set size of a logical cluster defined by a host operating system, any single file may include file content (or data) that occupies one or more logical clusters (and, by extension, may thus include one or more file regions, respectively).

In Step 228, file region metadata is obtained. In one or many embodiment(s) described herein, the file region metadata may reflect information descriptive of each file region of the file region(s) (identified in Step 226) that form the file. Examples of file region metadata, descriptive of any given file region, may include: a file region identifier associated with the given file region; a file region size (expressed in bytes) associated with the given file region; a region LCN identifying a logical cluster occupied with/by file content mapped to the given file region; and a storage offset referencing a storage location in host storage relative to a zero or start storage location thereof, where said storage location may correspond to a preset-sized chunk of host storage space that stores said file content mapped to the given file region.

In Step 230, a determination is made as to whether the shared cluster list (generated in Step 216) specifies the file. The determination may, for example, entail performing a query or lookup across the shared cluster list using a file identifier or filename associated with the file, which may or may not yield an entry in the shared cluster list. As such, in one or many embodiment(s) described herein, if it is determined that the shared cluster list does not specify the file (e.g., an entry is not identified following the aforementioned query/lookup), then the method proceeds to Step 232. On the other hand, in one or many other embodiment(s) described herein, if it is alternatively determined that the shared cluster list does specify the file (e.g., an entry is identified following the aforementioned query/lookup), then the method alternatively proceeds to Step 250 (see e.g., FIG. 2D).

In Step 232, following the determination (made in Step 230) that the shared cluster list (generated in Step 216) fails to specify the file, file content for the file is read. Particularly, in one or many embodiment(s) described herein, file content for each file region of the file region(s) (identified in 226) may be read from their corresponding physical location(s) on the host storage.

In Step 234, one or more container offsets is/are identified. In one or many embodiment(s) described herein, a cardinality (or number) of the identified container offset(s) may match a cardinality (or number) of the file region(s) (identified in Step 226). Further, each container offset may reference a storage location in the backup session data container (created in Step 222) relative to a zero or start storage location thereof. Moreover, each container offset may correspond to a preset-sized chunk of container storage space that may be available (or yet to be occupied with/by data) in the backup session data container. Should at least two container offsets be identified, said at least two container offsets may correspond to at least two chunks of container storage space, respectively, which may or may not be contiguous relative to one another.

In Step 236, the file content (read in Step 232) is written to the backup session data container (created in Step 222). Particularly, in one or many embodiment(s) described herein, file content for each file region of the file region(s) (identified in Step 226) may be written to the backup session data container at each container offset of the container offset(s) (identified in Step 234), respectively.

Hereinafter, the method proceeds to Step 240 (see e.g., FIG. 2C).

Figure 2C:
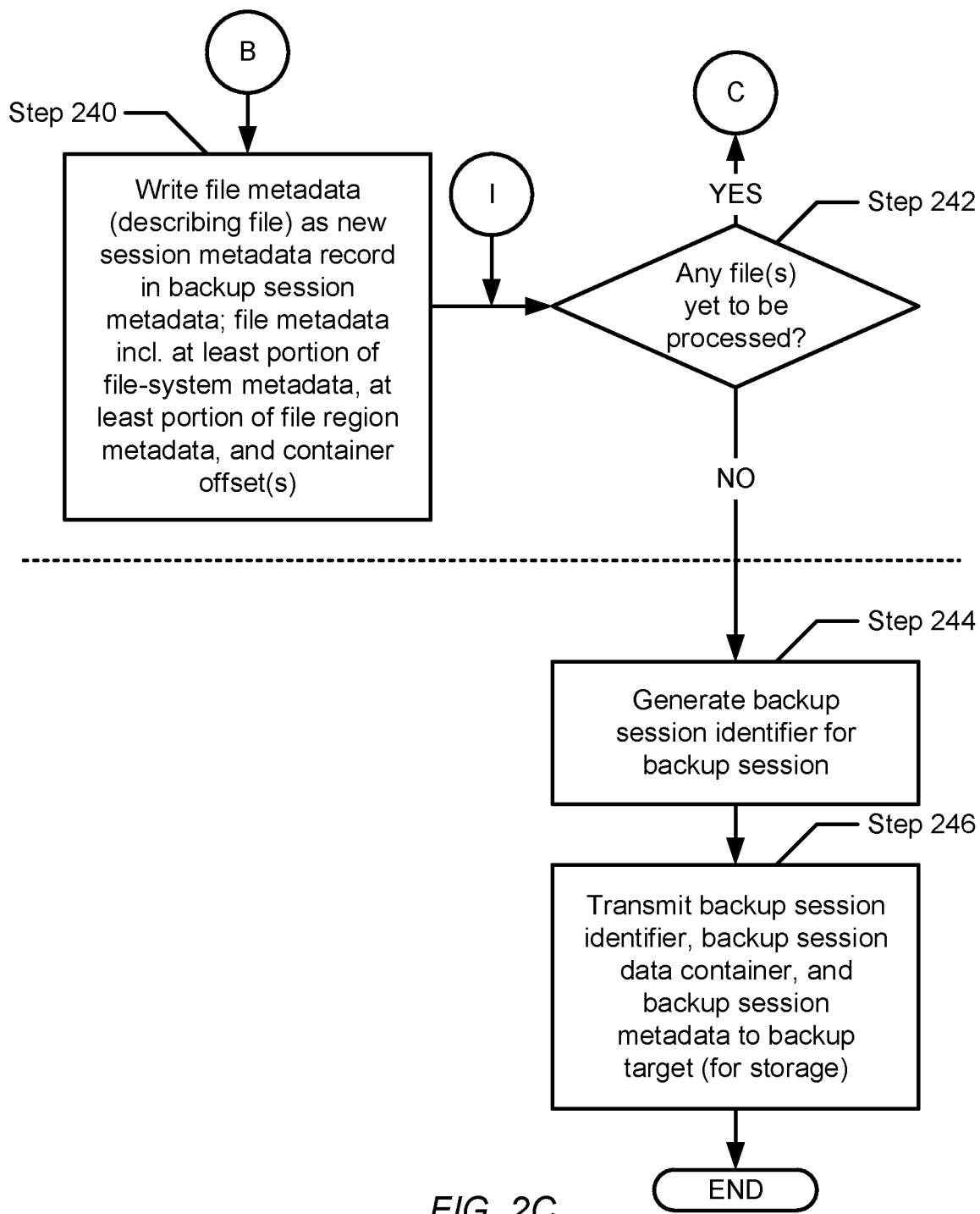

Turning to FIG. 2C, in Step 240, a new session metadata record, for the file, is created. In one or many embodiment(s) described herein, the new session metadata record may be maintained in the backup session metadata (created in Step 224). Further, the new session metadata record may store file metadata descriptive of the file, which may specify at least a portion of the file-system metadata (parsed in Step 210) for the file, at least a portion of the file region metadata (obtained in Step 228) for each file region of the file region(s) of the file, and the container offset(s) (identified in Step 234). Examples of file metadata (aside from the container offset(s)), stored in the new session metadata record for the file, may include: a file identifier and/or a filename associated with the file; at least one logical cluster number (LCN) respectively identifying at least one logical cluster associated with the file; a file region identifier associated with each file region of the file; a region LCN for each file region of the file identifying a logical cluster occupied with/by file content mapped to the file region; and a storage offset for each file region of the file referencing a storage location in host storage relative to a zero or start storage location thereof, where said storage location may correspond to a preset-sized chunk of host storage space that stores said file content mapped to the file region.

In Step 242, a determination is made as to whether any remaining file(s), of the files managed by the host file-system (specified in Step 200), is/are yet to be processed. In one or many embodiment(s) described herein, if it is determined that all files managed by the host file-system have been processed, then the method proceeds to Step 244. On the other hand, in one or many other embodiment(s) described herein, if it is alternatively determined that at least one remaining file of the files managed by the host file-system has not been processed yet, then the method alternatively proceeds to Step 226 (described above), where one or more file regions for a next file (to be processed) is/are identified.

In Step 244, following the determination (made in Step 242) that all files, managed by the host file-system (specified in Step 200), have been processed, a backup session identifier is generated. In one or many embodiment(s) described herein, the backup session identifier may specify any information that may uniquely identify and reference the backup session initiated through the file-system backup instruction (received in Step 200)—e.g., an arbitrary length character string generated for and assigned to the backup session, a time stamp encoding a date and/or time that the backup session completed, etc.

In Step 246, in association with and alongside the backup session identifier (generated in Step 244), the backup session data container (created in Step 222 and populated in Step 236, 260, or 278) and the backup session metadata (created in Step 224 and populated in Step 240 or 286) are transmitted to the backup target (see e.g., FIG. 1) for storage thereon. In one or many embodiment(s) described herein, upon receiving the aforementioned information tuple (i.e., the backup session identifier, the backup session data container, and the backup session metadata) from the host device, the backup target may be configured to store the information tuple in target storage (see e.g., FIG. 1) thereon.

Figure 2D:
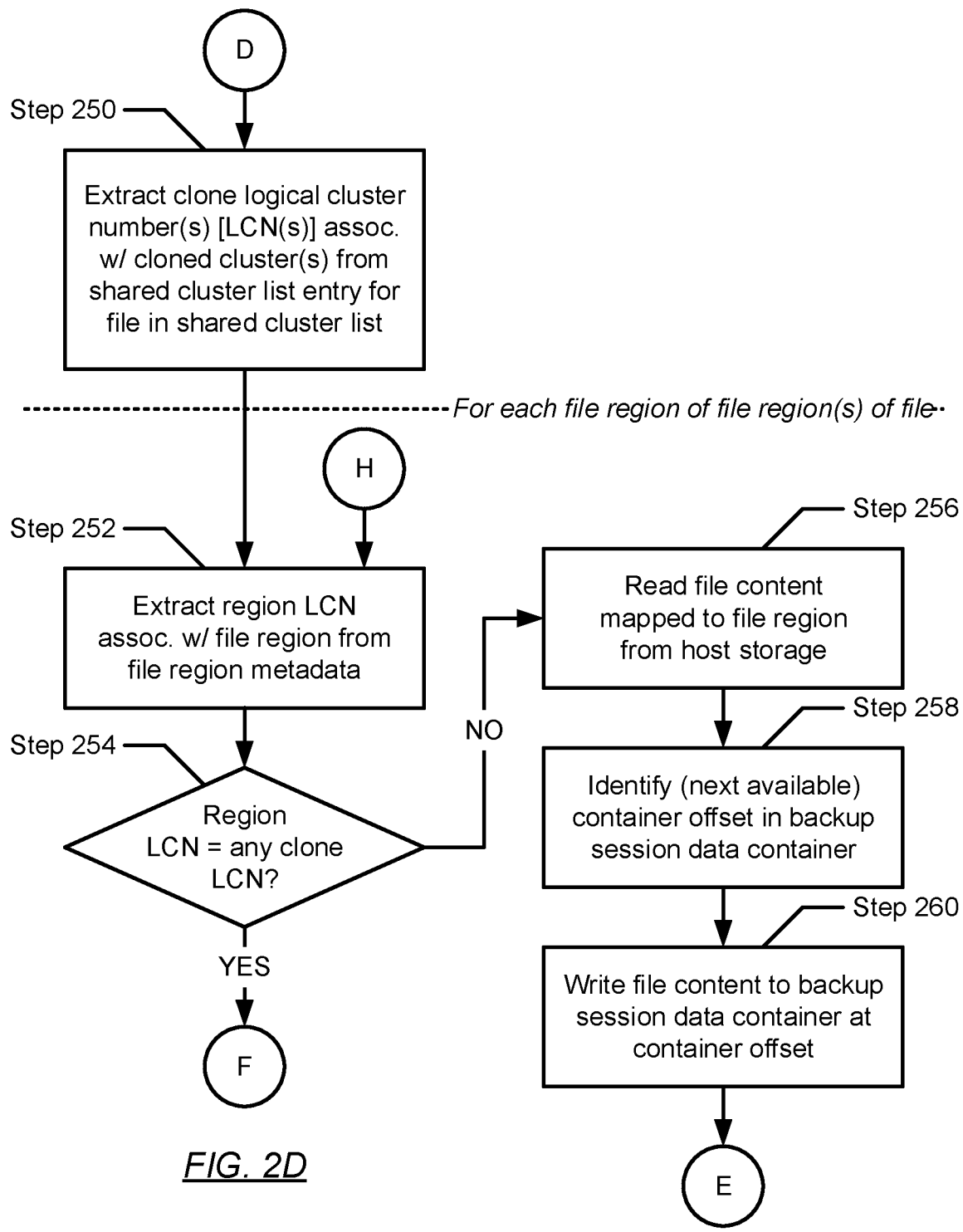

Turning to FIG. 2D, in Step 250, following the alternate determination (made in Step 230) that the shared cluster list (generated in Step 216) specifies the file, one or more clone logical cluster numbers (LCN) is/are obtained. In one or many embodiment(s) described herein, any LCN may generally refer to a storage address in host storage assigned to a particular logical cluster. Any clone LCN, accordingly, may refer to a storage address in host storage assigned to a cloned cluster, or a logical cluster that may be shared amongst and/or between one or more files. The clone LCN(s), moreover, may be obtained by way of their extraction from an entry, respective to the file, maintained in the shared cluster list.

Note: a portion of the remaining steps (i.e., Steps 252, 254, 256, 258, 260, 264, 266, 268, 270, 272, 274, 276, 278, 280, and 284) presented and described hereinafter are pertinent to, and thus performed for, each file region of the file region(s) (identified in Step 226) for the file.

In Step 252, a region LCN is obtained. In one or many embodiment(s) described herein, the region LCN may refer to a storage address in host storage assigned to a logical cluster that may be occupied by the data or file content of the file region. Further, the region LCN may be obtained by way of extraction thereof from the file region metadata (obtained in Step 228) for the file region.

In Step 254, a determination is made as to whether the region LCN (obtained in Step 254) matches any clone LCN of the clone LCN(s) (obtained in Step 250). In one or many embodiment(s) described herein, if it is determined that the region LCN fails to match any of the clone LCN(s), then the method proceeds to Step 256. On the other hand, in one or many other embodiment(s) described herein, if it is alternatively determined that the region LCN matches a clone LCN of the clone LCN(s), then the method alternatively proceeds to Step 264 (see e.g., FIG. 2E).

In Step 256, following the determination (made in Step 254) that the region LCN (obtained in Step 254) fails to match any clone LCN of the clone LCN(s) (obtained in Step 250), file content for the file region is read. Particularly, in one or many embodiment(s) described herein, said file content may be read from their corresponding physical location on the host storage.

In Step 258, a container offset is identified. In one or many embodiment(s) described herein, the container offset may reference a storage location in the backup session data container (created in Step 222) relative to a zero or start storage location thereof. Moreover, the container offset may correspond to a preset-sized chunk of container storage space that may be available (or yet to be occupied with/by data) in the backup session data container.

In Step 260, the file content (read in Step 256) is written to the backup session data container (created in Step 222). Particularly, in one or many embodiment(s) described herein, file content for the file region may be written to the backup session data container at the container offset (identified in Step 258).

Hereinafter, the method proceeds to Step 280 (see e.g., FIG. 2E).

Figure 2E:
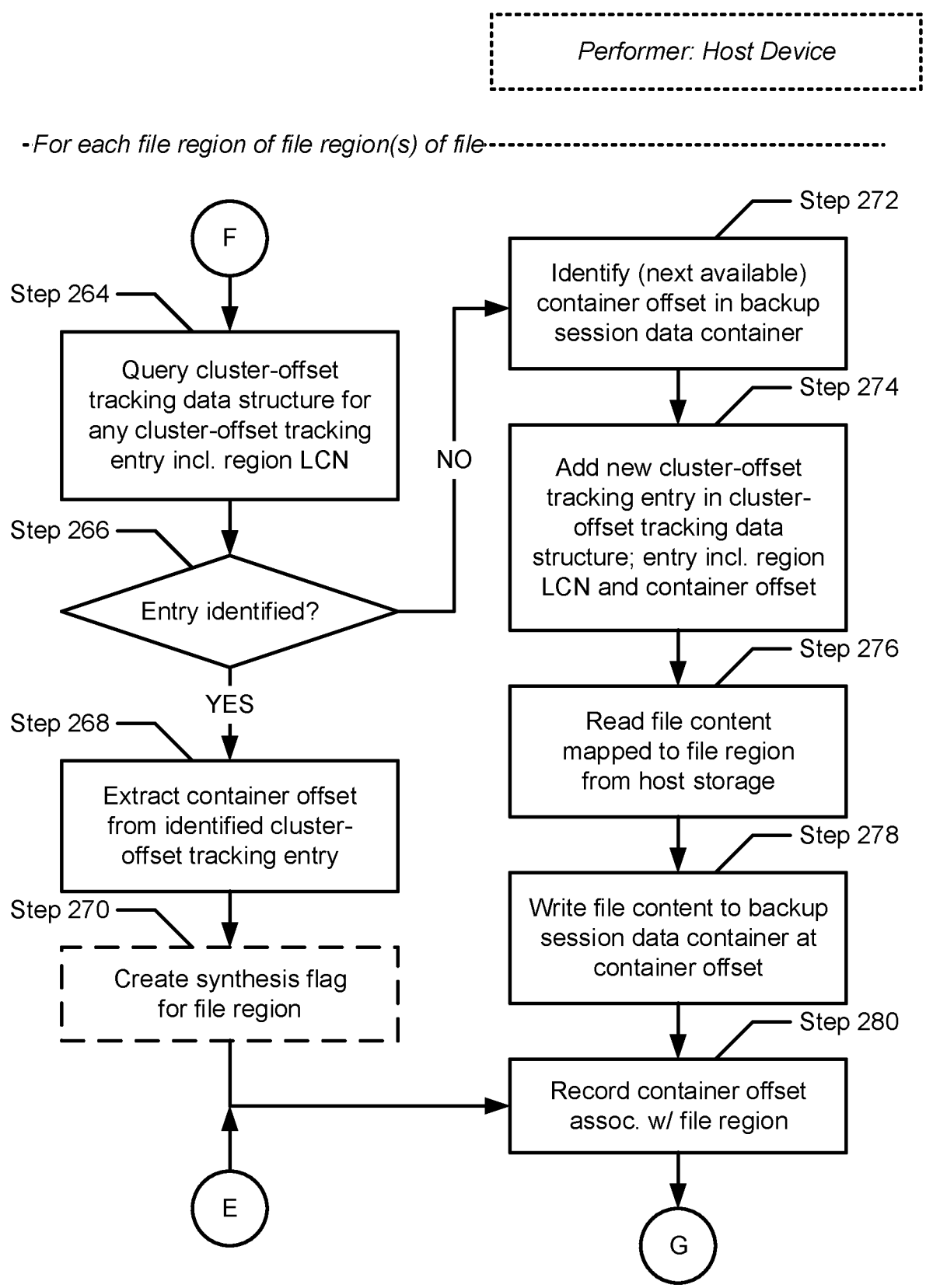

Turning to FIG. 2E, in Step 264, following the alternate determination (made in Step 254) that the region LCN (obtained in Step 254) matches a clone LCN of the clone LCN(s) (obtained in Step 250), a cluster-offset tracking data structure (described above) (see e.g., Step 220) is queried for any cluster-offset tracking entry/entries matching a query criterion. In one or many embodiment(s) described herein, the query criterion may require the identification of any cluster-offset tracking entry that at least includes or specifies the region LCN (obtained in Step 252).

In Step 266, based on the cluster-offset tracking data structure query (performed in Step 264), a determination is made as to whether a cluster-offset tracking entry has been identified. In one or many embodiment(s) described herein, if it is determined that a cluster-offset tracking entry has been identified, then the method proceeds to Step 268. On the other hand, in one or many other embodiment(s) described herein, if it is alternatively determined that a cluster-offset tracking entry has not been identified, then the method alternatively proceeds to Step 272.

In Step 268, following the determination (made in Step 266) that a cluster-offset tracking entry has been identified based on the cluster-offset tracking data structure query (performed in Step 264), a container offset is obtained. Particularly, in one or many embodiment(s) described herein, said container offset may be extracted from the identified cluster-offset tracking entry.

In Step 270, (optionally) a synthesis flag, for the file region, is created. In one or many embodiment(s) described herein, the synthesis flag may refer to a bi-state (e.g., binary) variable indicating whether the file region (or more specifically, the file content mapped thereto) should be synthesized at the backup target. If the synthesis flag is created and reflects a true or '1' value, then the backup target (following receipt of the information tuple transmitted by the host device in Step 246) may be configured to reconstruct the file content corresponding to the file region by way of read, copy, and write operations effectively producing a file content copy of the file content (corresponding to another file region of the file and/or another file) stored in the received backup session data container and, subsequently, storing said file content copy at a container offset in the received backup session data container designated for the file region. In reconstructing the file content corresponding to the file region at/by the backup target, a consumption of any available networking resources (e.g., bandwidth, etc.) can be reduced. Alternatively, if the synthesis flag is created and instead reflects a false or '0' value, then the backup target (following receipt of the information tuple transmitted by the host device in Step 246) may be configured to take no action concerning reconstruction of the file content corresponding to the file region.

Hereinafter, the method proceeds to Step 280 (described below).

In Step 272, following the alternate determination (made in Step 266) that a cluster-offset tracking entry has not been identified based on the cluster-offset tracking data structure query (performed in Step 264), a container offset is identified. In one or many embodiment(s) described herein, the container offset may reference a storage location in the backup session data container (created in Step 222) relative to a zero or start storage location thereof. Moreover, the container offset may correspond to a preset-sized chunk of container storage space that may be available (or yet to be occupied with/by data) in the backup session data container.

In Step 274, a new cluster-offset tracking entry, for the file region, is created. In one or many embodiment(s) described herein, the new cluster-offset tracking entry may be maintained in the cluster-offset tracking data structure (queried in Step 264). Further, the new cluster-offset tracking entry may store the region LCN (obtained in Step 252) and the container offset (identified in Step 272). The new cluster-offset tracking entry, therefore, stores a mapping relating a cloned cluster (i.e., associated with a clone LCN matching the region LCN) to the container offset. The container offset, in turn, may reference where file content, for at least the file region (i.e., at least one other file region of the file and/or one or more other files may map to the same/duplicate file content), is to be written (see e.g., Step 278 (described below)).

In Step 276, file content for the file region is read. Particularly, in one or many embodiment(s) described herein, said file content may be read from their corresponding physical location on the host storage.

In Step 278, the file content (read in Step 276) is written to the backup session data container (created in Step 222). Particularly, in one or many embodiment(s) described herein, file content for the file region may be written to the backup session data container at the container offset (identified in Step 272).

In Step 280, the container offset (obtained in Step 268 or identified in Step 272), respective to the file region, is recorded.

Hereinafter, the method proceeds to Step 284 (see e.g., FIG. 2F).

Figure 2F:
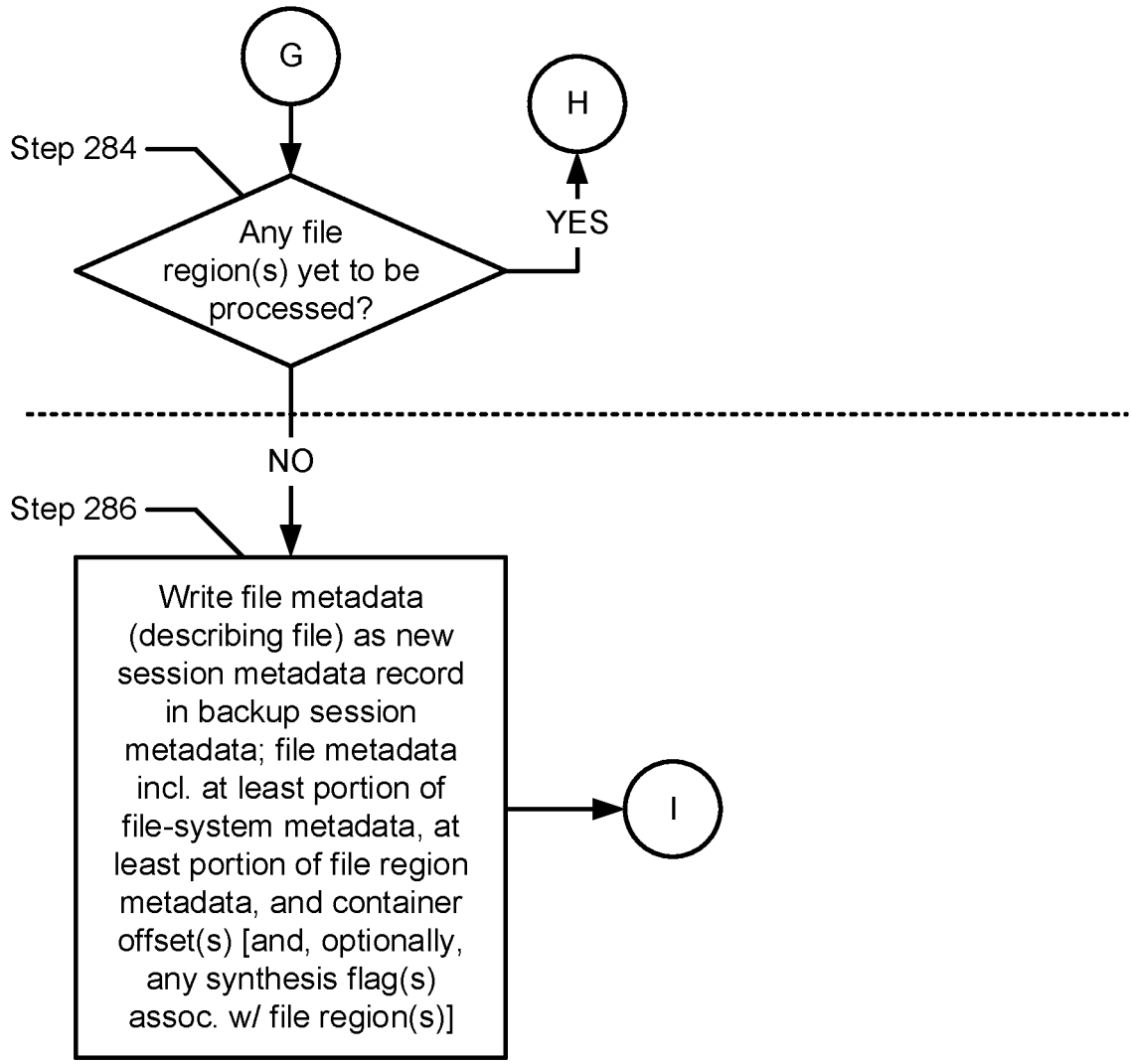

Turning to FIG. 2F, in Step 284, a determination is made as to whether any remaining file region(s) (identified in Step 226), of the file, is/are yet to be processed. In one or many embodiment(s) described herein, if it is determined that all file region(s) of the file has/have been processed, then the method proceeds to Step 286. On the other hand, in one or many other embodiment(s) described herein, if it is alternatively determined that at least one remaining file region of the file region(s) of the file has not been processed yet, then the method alternatively proceeds to Step 252 (described above), where a region LCN associated with a next file region (to be processed) is obtained.

In Step 286, following the determination (made in Step 284) that all file region(s) (identified in Step 226) of the file has/have been processed, a new session metadata record, for the file, is created. In one or many embodiment(s) described herein, the new session metadata record may be maintained in the backup session metadata (created in Step 224). Further, the new session metadata record may store file metadata descriptive of the file, which may specify at least a portion of the file-system metadata (parsed in Step 210) for the file, at least a portion of the file region metadata (obtained in Step 228) for each file region of the file region(s) of the file, the container offset(s) (recorded in Step 280), and any (optional) synthesis flag (created in Step 270) for each file region of the file region(s) of the file. Examples of file metadata (aside from the container offset(s) and any (optional) synthesis flag(s)), stored in the new session metadata record for the file, may include: a file identifier and/or a filename associated with the file; at least one logical cluster number (LCN) respectively identifying at least one logical cluster associated with the file; a file region identifier associated with each file region of the file; a region LCN for each file region of the file identifying a logical cluster occupied with/by file content mapped to the file region; and a storage offset for each file region of the file referencing a storage location in host storage relative to a zero or start storage location thereof, where said storage location may correspond to a preset-sized chunk of host storage space that stores said file content mapped to the file region.

Figure 3A:
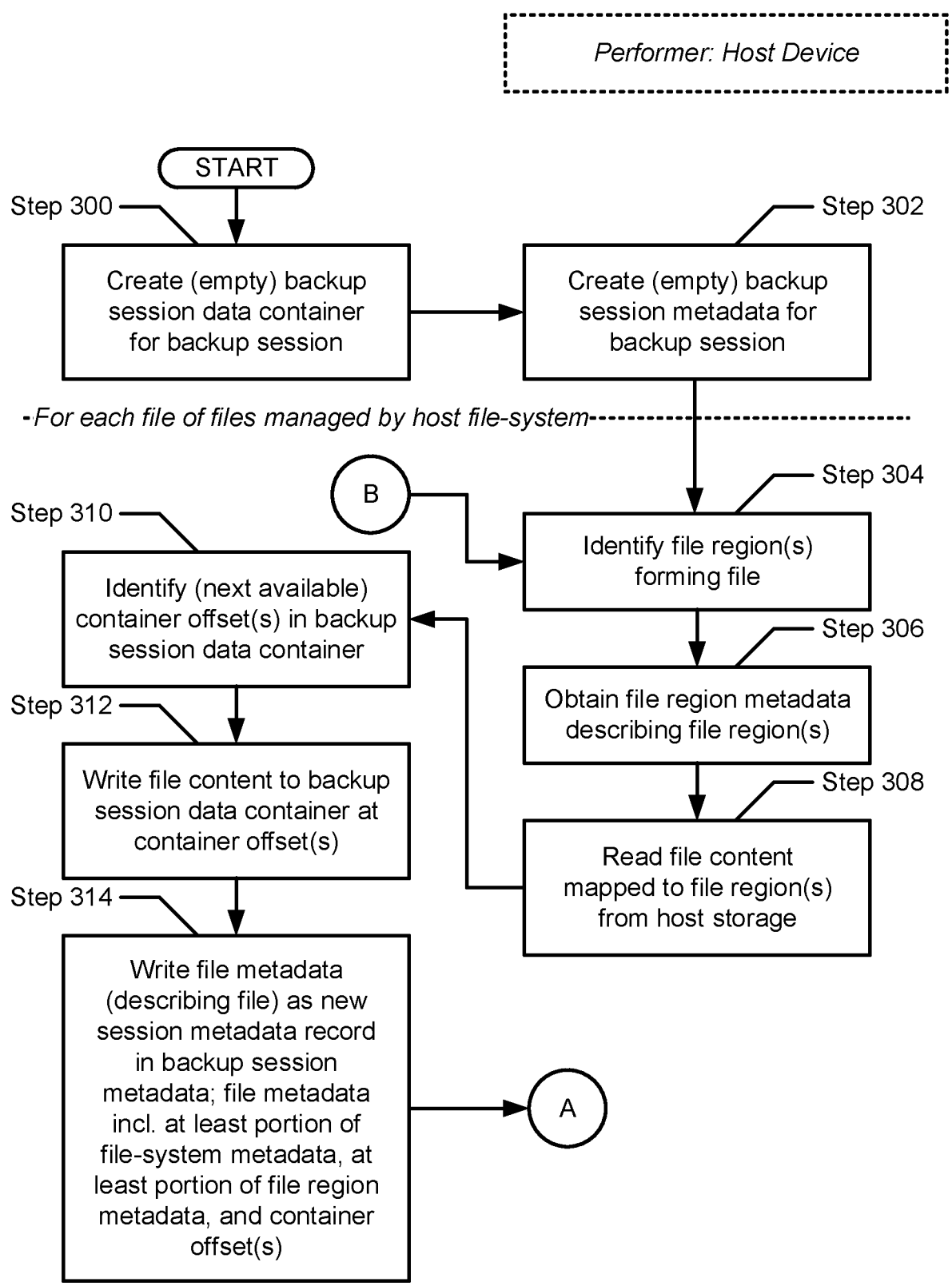
FIGS. 3A and 3B show a flowchart describing a method for conducting conventional file-based backup operations in accordance with one or more embodiments described herein.
Figure 3B:
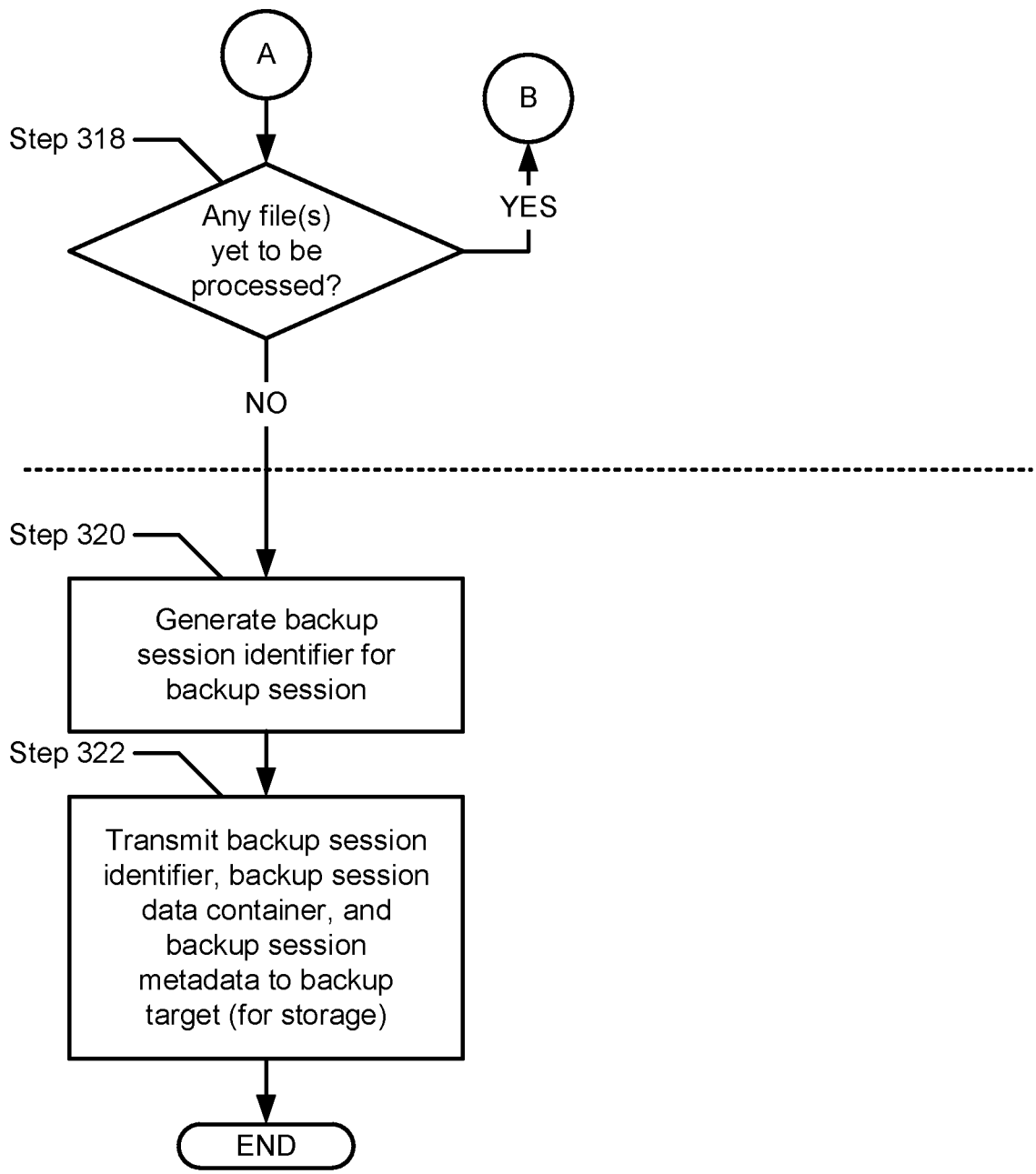

FIGS. 3A and 3B show a flowchart describing a method for conducting conventional file-based backup operations in accordance with one or more embodiments described herein. The various steps outlined below may be performed by the host device (or any subcomponent(s) thereof) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 3A, in Step 300, a/an (empty) backup session data container is created for the backup session initiated by a received file-system backup instruction (see e.g., Step 200 in FIG. 2A). In one or many embodiment(s) described herein, the backup session data container may refer to a container format (or metafile) (e.g., common data stream format (CDSF) container) configured to enable multiple data streams (as well as metadata detailing said data streams) to be embedded into a single file. The aforementioned data streams may include point-in-time backup copies (or snapshots) of one or more file regions respective to a single file, and/or to multiple files, stored/maintained on the host device, which may be backed up to the backup target during the backup session.

In Step 302, a/an (empty) backup session metadata is created for the backup session initiated by the received file-system backup instruction (see e.g., Step 200 in FIG. 2A). In one or many embodiment(s) described herein, the backup session metadata may refer to information descriptive of the completed backup operation process and/or the backup file region(s) of one or multiple backup file(s) stored/maintained in the backup session data container (created in Step 300 and populated in Step 312).

Note: a portion of the remaining steps (i.e., Steps 304, 306, 308, 310, 312, 314, and 318) presented and described hereinafter are pertinent to, and thus performed for, each file of the files managed by a specified host file-system (see e.g., Step 200 in FIG. 2A).

In Step 304, one or more file regions, forming the file, is/are identified. In one or many embodiment(s) described herein, any file region may refer to any portion of the file that alone occupies a single logical cluster. Depending on the set size of a logical cluster defined by a host operating system, any single file may include file content (or data) that occupies one or more logical clusters (and, by extension, may thus include one or more file regions, respectively).

In Step 306, file region metadata is obtained. In one or many embodiment(s) described herein, the file region metadata may reflect information descriptive of each file region of the file region(s) (identified in Step 304) that form the file. Examples of file region metadata, descriptive of any given file region, may include: a file region identifier associated with the given file region; a file region size (expressed in bytes) associated with the given file region; a region LCN identifying a logical cluster occupied with/by file content mapped to the given file region; and a storage offset referencing a storage location in host storage relative to a zero or start storage location thereof, where said storage location may correspond to a preset-sized chunk of host storage space that stores said file content mapped to the given file region.

In Step 308, file content for the file is read. Particularly, in one or many embodiment(s) described herein, file content for each file region of the file region(s) (identified in 304) may be read from their corresponding physical location(s) on the host storage.

In Step 310, one or more container offsets is/are identified. In one or many embodiment(s) described herein, a cardinality (or number) of the identified container offset(s) may match a cardinality (or number) of the file region(s) (identified in Step 304). Further, each container offset may reference a storage location in the backup session data container (created in Step 300) relative to a zero or start storage location thereof. Moreover, each container offset may correspond to a preset-sized chunk of container storage space that may be available (or yet to be occupied with/by data) in the backup session data container. Should at least two container offsets be identified, said at least two container offsets may correspond to at least two chunks of container storage space, respectively, which may or may not be contiguous relative to one another.

In Step 312, the file content (read in Step 308) is written to the backup session data container (created in Step 300). Particularly, in one or many embodiment(s) described herein, file content for each file region of the file region(s) (identified in Step 304) may be written to the backup session data container at each container offset of the container offset(s) (identified in Step 310), respectively.

In Step 314, a new session metadata record, for the file, is created. In one or many embodiment(s) described herein, the new session metadata record may be maintained in the backup session metadata (created in Step 302). Further, the new session metadata record may store file metadata descriptive of the file, which may specify at least a portion of obtained file-system metadata (see e.g., Step 210 in FIG. 2A) for the file, at least a portion of the file region metadata (obtained in Step 306) for each file region of the file region(s) of the file, and the container offset(s) (identified in Step 310). Examples of file metadata (aside from the container offset(s)), stored in the new session metadata record for the file, may include: a file identifier and/or a filename associated with the file; at least one logical cluster number (LCN) respectively identifying at least one logical cluster associated with the file; a file region identifier associated with each file region of the file; a region LCN for each file region of the file identifying a logical cluster occupied with/by file content mapped to the file region; and a storage offset for each file region of the file referencing a storage location in host storage relative to a zero or start storage location thereof, where said storage location may correspond to a preset-sized chunk of host storage space that stores said file content mapped to the file region.

Hereinafter, the method proceeds to Step 318 (see e.g., FIG. 3B).

Turning to FIG. 3B, in Step 318, a determination is made as to whether any remaining file(s), of the files managed by the specified host file-system (see e.g., Step 200 in FIG. 2A), is/are yet to be processed. In one or many embodiment(s) described herein, if it is determined that all files managed by the host file-system have been processed, then the method proceeds to Step 320. On the other hand, in one or many other embodiment(s) described herein, if it is alternatively determined that at least one remaining file of the files managed by the host file-system has not been processed yet, then the method alternatively proceeds to Step 304 (described above), where one or more file regions for a next file (to be processed) is/are identified.

In Step 320, following the determination (made in Step 318) that all files, managed by the specified host file-system (see e.g., Step 200 in FIG. 2A), have been processed, a backup session identifier is generated. In one or many embodiment(s) described herein, the backup session identifier may specify any information that may uniquely identify and reference the backup session initiated through the received file-system backup instruction (see e.g., Step 200 in FIG. 2A)—e.g., an arbitrary length character string generated for and assigned to the backup session, a time stamp encoding a date and/or time that the backup session completed, etc.

In Step 322, in association with and alongside the backup session identifier (generated in Step 320), the backup session data container (created in Step 300 and populated in Step 312) and the backup session metadata (created in Step 302 and populated in Step 314) are transmitted to the backup target (see e.g., FIG. 1) for storage thereon. In one or many embodiment(s) described herein, upon receiving the aforementioned information tuple (i.e., the backup session identifier, the backup session data container, and the backup session metadata) from the host device, the backup target may be configured to store the information tuple in target storage (see e.g., FIG. 1) thereon.

FIGS. 4A-4D show a flowchart describing a method for leveraging file-system block cloning for efficient file-based recovery operations in accordance with one or more embodiments described herein. The various steps outlined below may be performed by the host device (or any subcomponent(s) thereof) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Figure 4A:
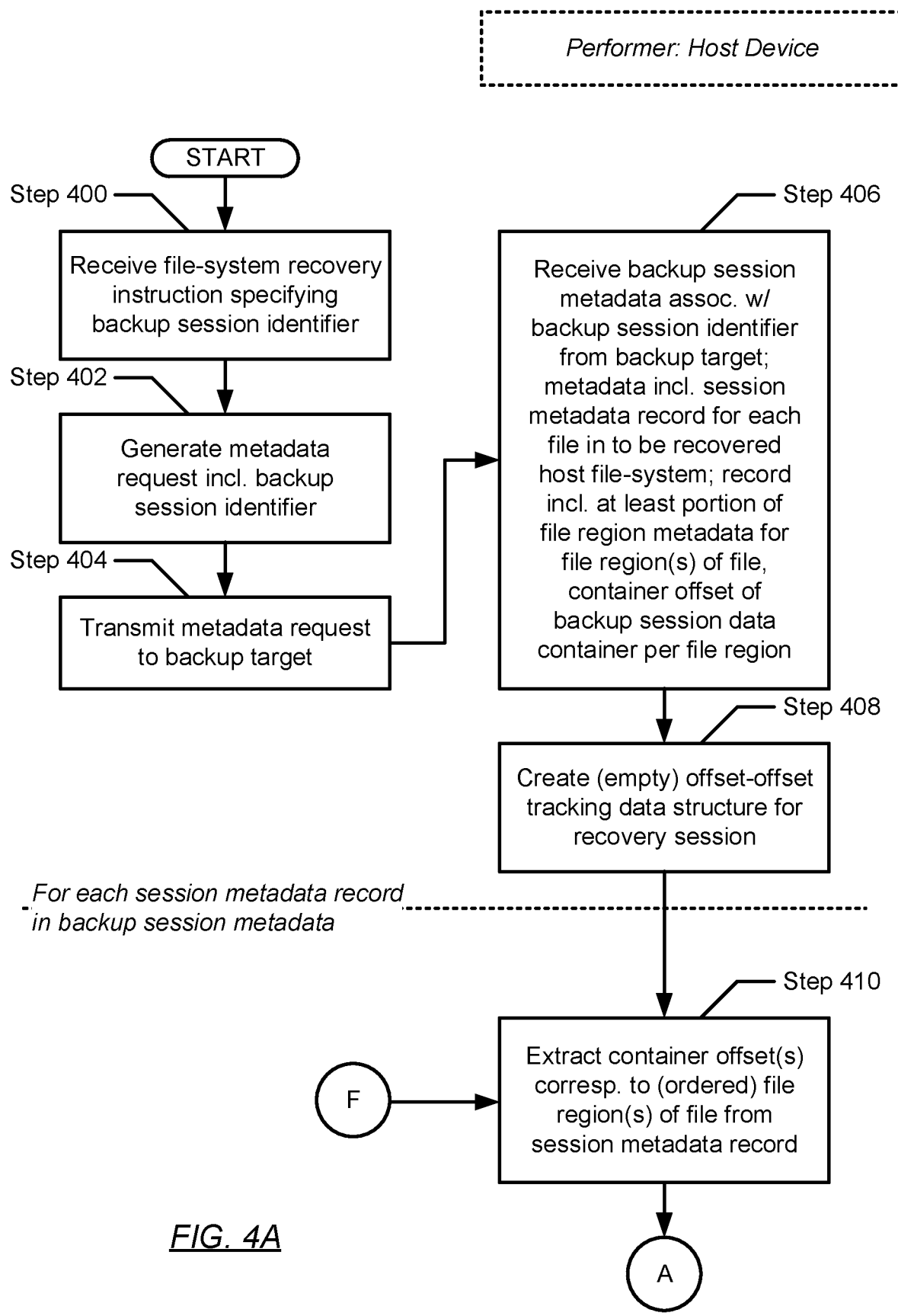
FIGS. 4A-4D show a flowchart describing a method for leveraging file-system block cloning for efficient file-based recovery operations in accordance with one or more embodiments described herein.

Turning to FIG. 4A, in Step 400, a file-system recovery instruction is received. In one or many embodiment(s) described herein, the file-system recovery instruction may include or specify a backup session identifier assigned to and uniquely identifying a previously-completed backup session that had been initiated on the host device. The file-system recovery instruction, accordingly, may pertain to an on-demand request, usually following the occurrence of data loss on a host device, for conducting a recovery operation (or a recovery session) entailing or targeting a set of files that the host device has lost.

In Step 402, a metadata request is generated. In one or many embodiment(s) described herein, the metadata request may include or specify the backup session identifier (received via the file-system recovery instruction in Step 400).

In Step 404, the metadata request (generated in Step 402) is transmitted to the backup target. In one or many embodiment(s) described herein, upon receiving the metadata request from the host device, the backup target may be configured to: extract the backup session identifier from the metadata request; query the target storage (see e.g., FIG. 1) thereon for/using the backup session identifier to identify an information tuple including the backup session identifier, as well as a backup session data container and backup session metadata associated with the backup session identifier; obtain the backup session metadata (or a copy thereof); and return, in response to the metadata request, the backup session metadata (or the copy thereof) to the host device.

In Step 406, backup session metadata is received from the backup target. In one or many embodiment(s) described herein, the backup session metadata may be associated with the backup session identifier (transmitted via the metadata request in Step 404). Further, the backup session metadata may organize information therein across one or more session metadata records, where each session metadata record of the session metadata record(s) respectively corresponds to a file of the file(s) that had been previously backed up during the backup session identified by the backup session identifier. Moreover, each session metadata record may store file metadata descriptive of a corresponding file, which may specify at least a portion of obtained file-system metadata (see e.g., Step 210 in FIG. 2A) for the file, at least a portion of obtained file region metadata (see e.g., Step 228 in FIG. 2B or Step 306 in FIG. 3A) for each file region of the file region(s) of the file, and one or more obtained container offsets (see e.g., Step 234 in FIG. 2B, Step 258 in FIG. 2D, Step 268 or 272 in FIG. 2E, or Step 310 in FIG. 3A) corresponding to the file region(s), respectively, of the file. Examples of file metadata (aside from the container offset(s)), stored in the new session metadata record for the file, may include: a file identifier and/or a filename associated with the file; at least one logical cluster number (LCN) respectively identifying at least one logical cluster associated with the file; a file region identifier associated with each file region of the file; a region LCN for each file region of the file identifying a logical cluster occupied with/by file content mapped to the file region; and a storage offset for each file region of the file referencing a storage location in host storage relative to a zero or start storage location thereof, where said storage location may correspond to a preset-sized chunk of host storage space that stores said file content mapped to the file region.

In Step 408, an (empty) offset-offset tracking data structure is created for the recovery session initiated by the file-system recovery instruction (received in Step 400). In one or many embodiment(s) described herein, the offset-offset tracking data structure may refer to a data structure (e.g., a table) in which container offset to storage offset mappings may be tracked/maintained. The offset-offset tracking data structure, further, may organize said mappings through one or more offset-offset tracking entries, where each offset-offset tracking entry may correspond to a different/distinct container offset specified across the session metadata record(s) of the backup session metadata (received in Step 406).

Henceforth, in one or many embodiment(s) described herein, for any different/distinct container offset specified across the session metadata record(s), the offset-offset tracking entry corresponding thereto may include or specify: the container offset referencing a storage location in a backup session data container (stored on the backup target for and during a previously completed backup session associated with the backup session identifier (received in Step 400)) relative to a zero or start storage location thereof (where said (container) storage location may correspond to a preset-sized chunk of container storage space that stores file content mapped to a duplicate file region found across one or more files); and a storage offset referencing a storage location in host storage of the host device (whereon the set of files targeted by the file-system recovery instruction (received in Step 400) is to be recovered) relative to a zero or start storage location thereof (where said (host) storage location may correspond to a preset-sized chunk of host storage space that stores the file content mapped to the duplicate file region found across one or more files).

Note: a portion of the remaining steps (i.e., Steps 410, 414, 416, 418, 420, 422, 424, 426, 430, 432, 434, 436, 438, 440, 442, and 446) presented and described hereinafter are pertinent to, and thus performed for, each session metadata record of the session metadata records in the backup session metadata (received in Step 406).

In Step 410, one or more container offsets is/are obtained. Particularly, in one or many embodiment(s) described herein, the container offset(s) may be extracted from the session metadata record, which may pertain to a given file (intended to be recovered). Further, a cardinality (or number) of the container offset(s) may match a cardinality (or number) of the file region(s) that form the given file.

Figure 4B:
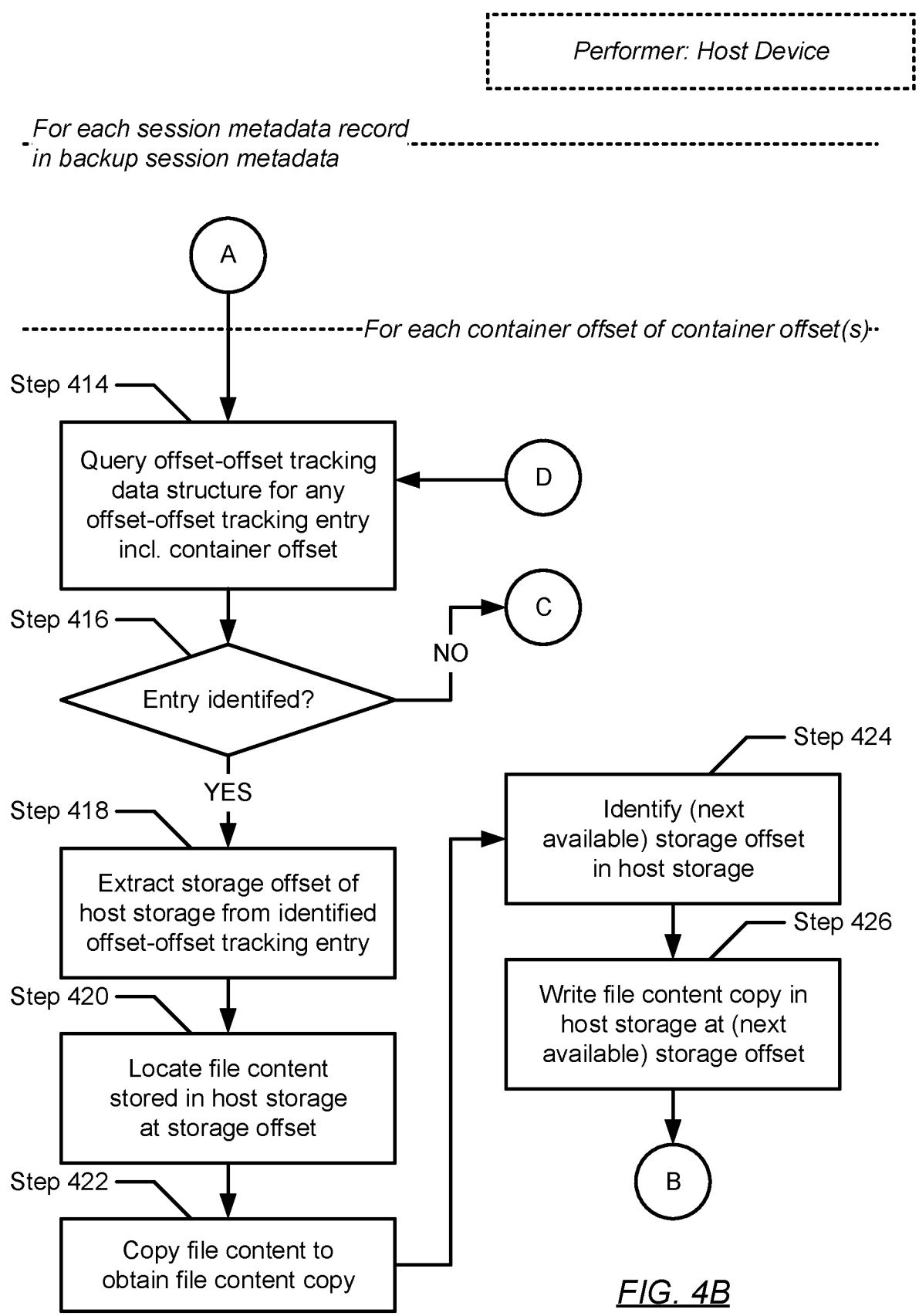

Hereinafter, the method proceeds to Step 414 (see e.g., FIG. 4B).

Note: a portion of the remaining steps (i.e., Steps 414, 416, 418, 420, 422, 424, 426, 430, 432, 434, 436, 438, 440, and 442) presented and described hereinafter are pertinent to, and thus performed for, each container offset of the container offset(s) (obtained in Step 410) for the given file.

In Step 414, the offset-offset tracking data structure (created in Step 408 and populated in Step 432) is queried for any offset-offset tracking entry/entries matching a query criterion. In one or many embodiment(s) described herein, the query criterion may require the identification of any offset-offset tracking entry that at least includes or specifies the container offset.

In Step 416, based on the offset-offset tracking data structure query (performed in Step 414), a determination is made as to whether an offset-offset tracking entry has been identified. In one or many embodiment(s) described herein, if it is determined that an offset-offset tracking entry has been identified, then the method proceeds to Step 418. On the other hand, in one or many other embodiment(s) described herein, if it is alternatively determined that an offset-offset tracking entry has not been identified, then the method alternatively proceeds to Step 430 (see e.g., FIG. 4C).

In Step 418, following the determination (made in Step 416) that an offset-offset tracking entry has been identified based on the offset-offset tracking data structure query (performed in Step 414), a storage offset is obtained. Particularly, in one or many embodiment(s) described herein, the storage offset may be extracted from the identified offset-offset tracking entry. Further, the storage offset may reference a storage location in the host storage of the host device (see e.g., FIG. 1) relative to a zero or start storage location thereof. Moreover, the storage offset may correspond to a preset-sized chunk of host storage space that may be occupied with/by file content, which had been recovered onto the host device earlier. The file content may represent the given file in entirety or in part; and may have previously been recovered through the processing of a previous container offset either associated with the given file (i.e., had the given file include a previous file region reflecting the same or duplicated data as the file content) or associated with a previously processed file (i.e., had the previously processed file include a file region reflecting the same/duplicated data as the file content).

In Step 420, file content is located. Particularly, in one or many embodiment(s) described herein, said file content may be stored, and thus found, in the host storage of the host device at the storage offset (obtained in Step 418).

In Step 422, the file content (located in Step 420) is subsequently copied to obtain a file content copy.

In Step 424, a new storage offset is identified. In one or many embodiment(s) described herein, the new storage offset may reference a storage location in the host storage of the host device relative to a zero or start storage location thereof. Moreover, the new storage offset may correspond to a preset-sized chunk of host storage space that may be available (or yet to be occupied with/by data) in the host storage.

In Step 426, the file content copy (obtained in Step 422) is written to the host storage of the host device. Particularly, in one or many embodiment(s) described herein, the file content copy, for a given file region of the given file, may be written to (and thus recovered on) the host storage at the new storage offset (identified in Step 424).

Hereinafter, the method proceeds to Step 442 (see e.g., FIG. 4C).

Figure 4C:
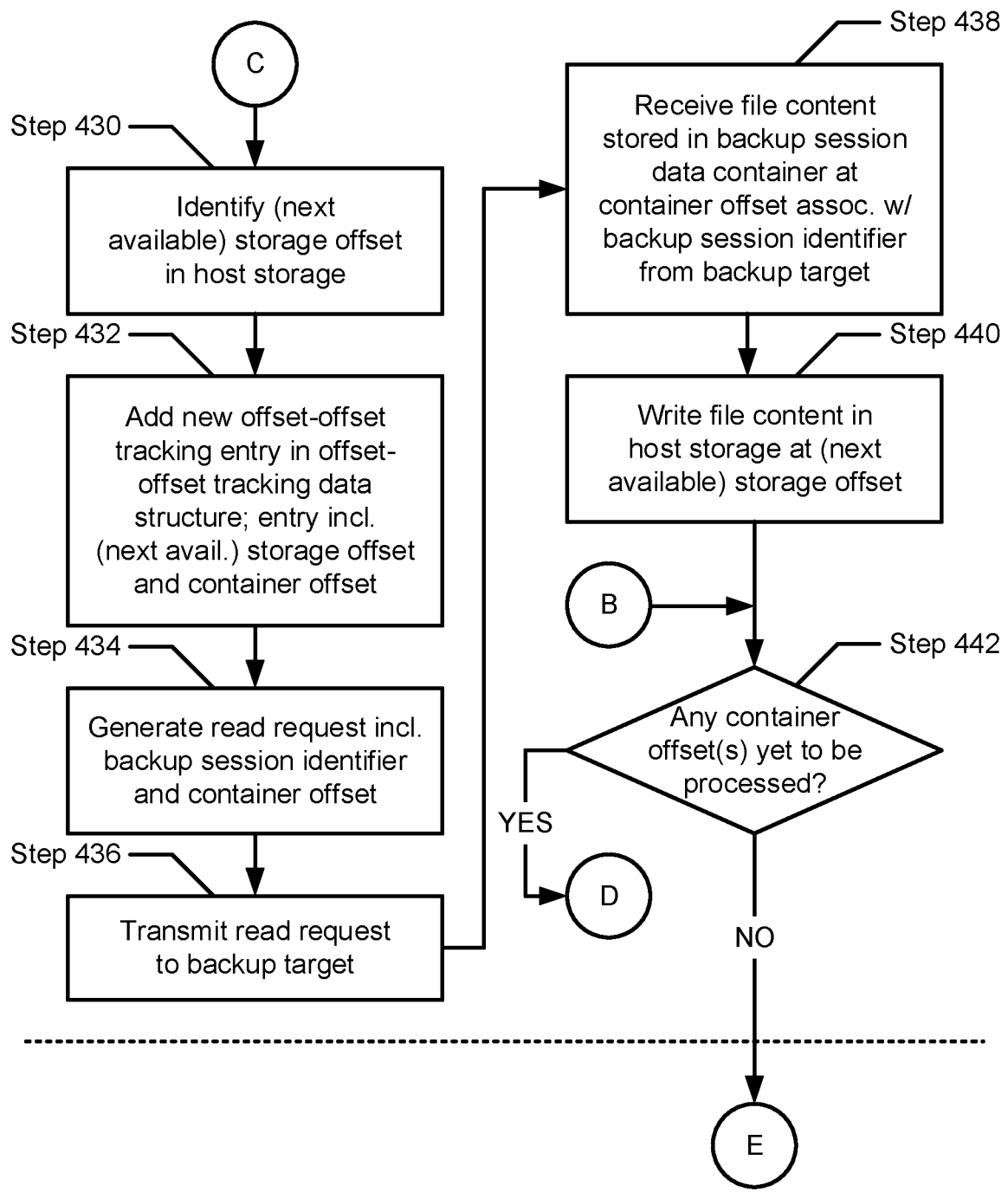

Turning to FIG. 4C, in Step 430, following the alternate determination (made in Step 416) that an offset-offset tracking entry had not been identified based on the offset-offset tracking data structure query (performed in Step 414), a storage offset is identified. In one or many embodiment(s) described herein, the storage offset may reference a storage location in the host storage of the host device relative to a zero or start storage location thereof. Moreover, the storage offset may correspond to a preset-sized chunk of host storage space that may be available (or yet to be occupied with/by data) in the host storage.

In Step 432, a new offset-offset tracking entry, for a given file region (i.e., corresponding to the container offset) for the given file, is created. In one or many embodiment(s) described herein, the new offset-offset tracking entry may be maintained in the offset-offset tracking data structure (created in Step 408). Further, the new offset-offset tracking entry may store the container offset and the storage offset (identified in Step 430). The new offset-offset tracking entry, therefore, stores a mapping relating file content (i.e., corresponding to the backup session identifier (received in Step 400) and maintained on a backup session data container associated therewith on the backup target at the container offset) to the storage offset. The storage offset, in turn, may reference where same/duplicate file content (as the aforementioned file content), for at least the given file region (i.e., at least one other file region of the given file and/or one or more other files may map to the same/duplicate file content), is to be written (see e.g., Step 440 (described below)).

In Step 434, a read request is generated. In one or many embodiment(s) described herein, the read request may include or specify the backup session identifier (received via the file-system recovery instruction in Step 400) and the container offset.

In Step 436, the read request (generated in Step 434) is transmitted to the backup target. In one or many embodiment(s) described herein, upon receiving the read request from the host device, the backup target may be configured to: extract the backup session identifier and the container offset from the read request; query the target storage (see e.g., FIG. 1) thereon for/using the backup session identifier to identify an information tuple including the backup session identifier, as well as a backup session data container and backup session metadata associated with the backup session identifier; locate a preset-sized chunk of container storage space in the backup session data container at the container offset; obtain file content (or a copy thereof) stored in the preset-sized chunk of the container storage space; and return, in response to the read request, the file content (or the copy thereof) to the host device.

In Step 438, file content is received. In one or many embodiment(s) described herein, the file content may be associated with the backup session identifier and the container offset (transmitted via the read request in Step 436).

In Step 440, the file content (received in Step 438) is written to the host storage of the host device. Particularly, in one or many embodiment(s) described herein, the file content, for a given file region of the given file, may be written to (and thus recovered on) the host storage at the storage offset (identified in Step 430).

In Step 442, a determination is made as to whether any remaining container offset(s), respective to the given file and obtained (in Step 410) from the session metadata record, is/are yet to be processed. In one or many embodiment(s) described herein, if it is determined that all container offset(s) respective to the given file has/have been processed, then the method proceeds to Step 446 (see e.g., FIG. 4D). On the other hand, in one or many other embodiment(s) described herein, if it is alternatively determined that at least one remaining container offset respective to the given file has not been processed yet, then the method alternatively proceeds to Step 414 (described above), where the offset-offset tracking data structure is queried for/using a next container offset (to be processed).

Figure 4D:
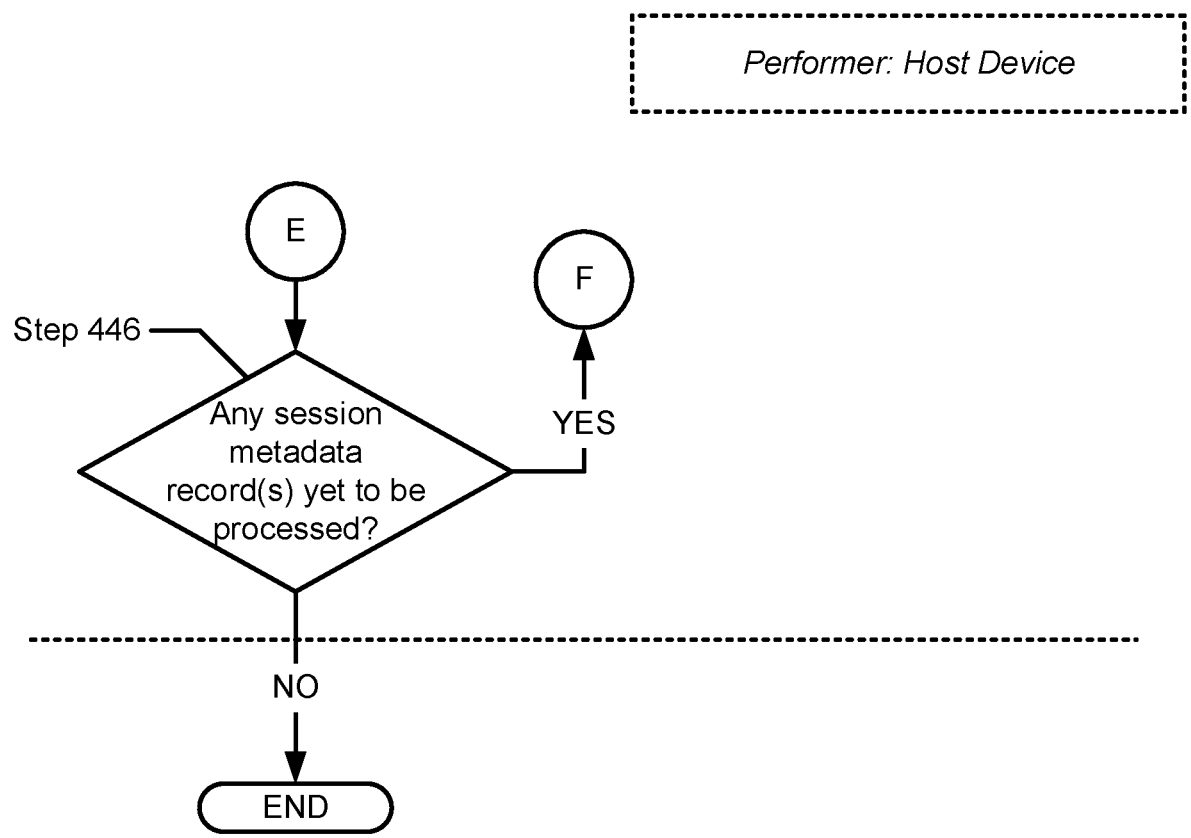

Turning to FIG. 4D, following the determination (made in Step 442) that all container offset(s) (obtained in Step 410) respective to the given file has/have been processed, a determination is made as to whether any remaining session metadata record(s) in/of the backup session metadata (received in Step 406), is/are yet to be processed. In one or many embodiment(s) described herein, if it is determined that all session metadata records have been processed, then the method ends. On the other hand, in one or many other embodiment(s) described herein, if it is alternatively determined that at least one remaining session metadata record has not been processed yet, then the method alternatively proceeds to Step 410 (described above), where one or more container offsets is/are obtained from a next session metadata record (to be processed).

Figure 5:
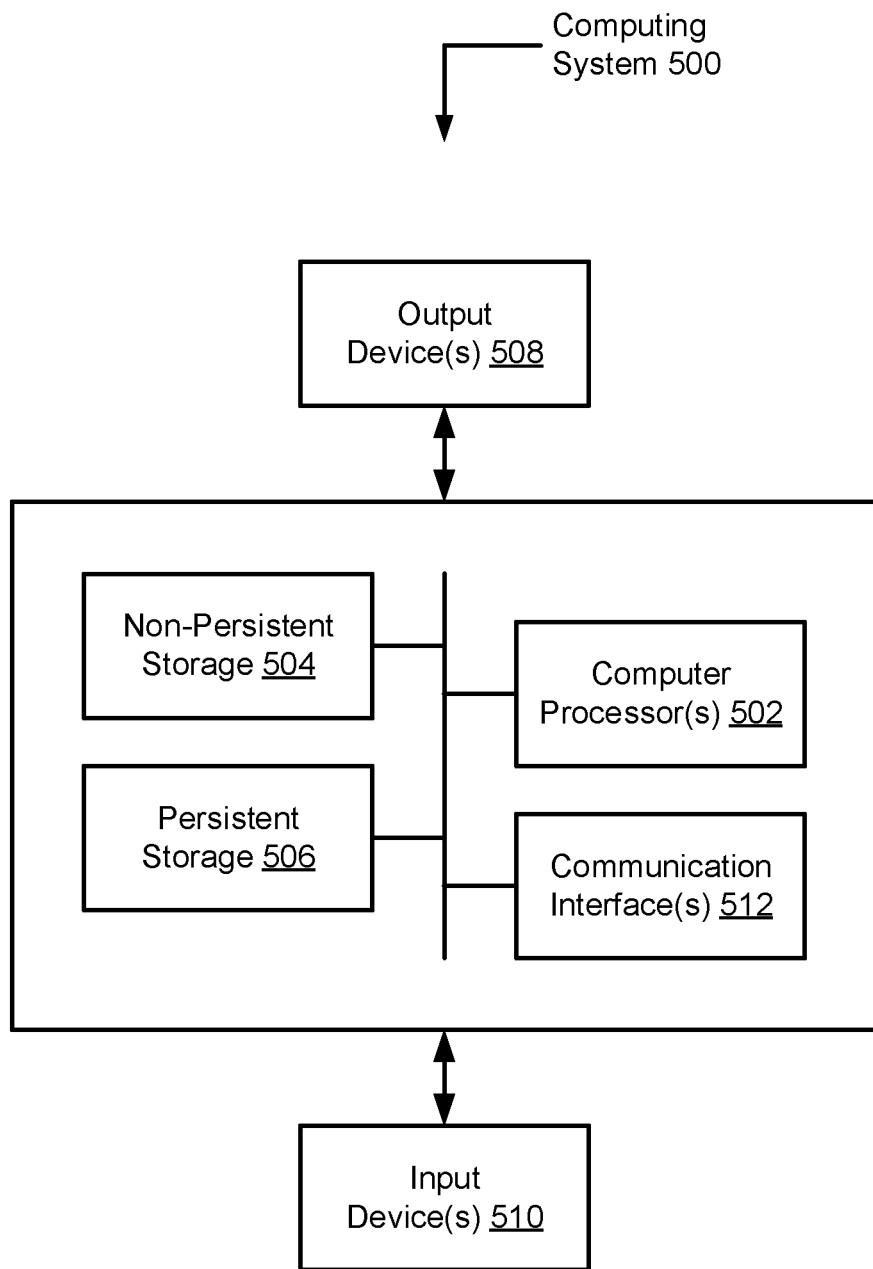
FIG. 5 shows an exemplary computing system in accordance with one or more embodiments described herein.

FIG. 5 shows an exemplary computing system in accordance with one or more embodiments described herein. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one or many embodiment(s) described herein, the computer processor(s) (502) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one or many embodiment(s) described herein, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments described herein.

While the embodiments described herein have been described with respect to a limited number of embodiments, those skilled in the art, having benefit of this disclosure, will appreciate that other embodiments can be devised which do not depart from the scope of the embodiments described herein. Accordingly, the scope of the embodiments described herein should be limited only by the attached claims.

What is claimed is:

1. A method for efficient file-based backups and recoveries, the method comprising:
receiving, to initiate a backup session, a file-system backup instruction identifying a host file-system;
obtaining at least one clone logical cluster number (LCN) corresponding to a file managed by the host file-system, and a region LCN corresponding to a file region of the file;
based on a determination that the region LCN matches a clone LCN of the at least one clone LCN:
querying a cluster-offset tracking data structure using the region LCN to identify a cluster-offset tracking entry comprising the region LCN and a container offset;
writing, as a session metadata record stored in backup session metadata for the backup session, file metadata describing the file and comprising the container offset; and
transmitting, to a backup target, an information tuple comprising a backup session identifier generated for the backup session, and the backup session metadata.

2. The method of claim 1, wherein the host file-system supports block cloning.

3. The method of claim 1, the method further comprising:
prior to the determination:
adding, to the cluster-offset tracking data structure, the cluster-offset tracking entry comprising a second region LCN matching the region LCN, and the container offset.

4. The method of claim 3, the method further comprising:
prior to adding the cluster-offset tracking entry:
based on a second determination that the second region LCN matches the clone LCN:
querying the cluster-offset tracking data structure using the second region LCN to deduce that the cluster-offset tracking data structure lacks the cluster-offset tracking entry;
identifying the container offset initially referencing unoccupied container storage space in a backup session data container for the backup session;
reading, from host storage, file content mapped to a second file region corresponding to the second region LCN; and
writing the file content to the backup session data container at the container offset.

5. The method of claim 4, wherein the information tuple further comprises the backup session data container, and wherein the file content further maps to the file region of the file.

6. The method of claim 4, the method further comprising:
after obtaining the at least one clone LCN corresponding to the file and prior to obtaining the region LCN corresponding to the file region of the file:
obtaining the second region LCN corresponding to the second file region that, at least in part, forms the file.

7. The method of claim 4, the method further comprising:
prior to obtaining the at least one clone LCN corresponding to the file:
obtaining at least one second clone LCN corresponding to a second file managed by the host file-system, and the second region LCN corresponding to the second file region that, at least in part, forms the second file,
wherein a second clone LCN of the at least one second clone LCN matches the clone LCN.

8. The method of claim 1, wherein the at least one clone LCN is respectively associated with at least one cloned cluster, and wherein each cloned cluster of the at least one cloned cluster represents a shared logical cluster.

9. The method of claim 8, wherein the shared logical cluster references host storage space in host storage that maps to at least one file region of a group of file regions comprising the file region of the file and a second file region of the file, and the file region of the file and a second file region of a second file managed by the host file-system.

10. The method of claim 1, the method further comprising:
receiving, to initiate a recovery session following a data loss, a file-system recovery instruction comprising the backup session identifier;
receiving, from the backup target and in response to transmission thereto of a metadata request comprising the backup session identifier, the backup session metadata associated with the backup session identifier;
extracting, from the session metadata record for the file in the backup session metadata, the container offset mapped to the file region of the file;
based on a second determination that an offset-offset tracking data structure comprises an offset-offset tracking entry comprising the container offset and a storage offset:
locating, mapped to at least the file region of the file, file content stored in host storage at the storage offset;
copying the file content to obtain a file content copy;
identifying a new storage offset initially referencing unoccupied host storage space in the host storage; and
writing, to recover at least a portion of the data loss, the file content copy in the host storage at the new storage offset.

11. The method of claim 10, the method further comprising:
prior to the second determination:
adding, to the offset-offset tracking data structure, the offset-offset tracking entry comprising a second container offset matching the container offset, and the storage offset.

12. The method of claim 11, the method further comprising:
prior to adding the offset-offset tracking entry:
based on a second determination that the offset-offset tracking data structure lacks the offset-offset tracking entry:
identifying the storage offset initially referencing second unoccupied host storage space in the host storage;
receiving, from the backup target and in response to transmission thereto of a read request comprising the backup session identifier and the container offset, the file content stored at the container offset in a backup session container associated with the backup session identifier; and
writing the file content to the host storage at the storage offset.

13. The method of claim 12, the method further comprising:
prior to extracting the container offset mapped to the file region of the file:
extracting, from the session metadata record for the file in the backup session metadata, the second container offset mapped to a second file region of the file.

14. The method of claim 12, the method further comprising:
prior to extracting the container offset mapped to the file region of the file:
extracting, from a second session metadata record for a second file in the backup session metadata, the second container offset mapped to a second file region of the second file.

15. A non-transitory computer readable medium (CRM) comprising computer readable program code, which when executed by a computer processor, enables the computer processor to perform a method for efficient file-based backups and recoveries, the method comprising:
receiving, to initiate a backup session, a file-system backup instruction identifying a host file-system;
obtaining at least one clone logical cluster number (LCN) corresponding to a file managed by the host file-system, and a region LCN corresponding to a file region of the file;
based on a determination that the region LCN matches a clone LCN of the at least one clone LCN:
querying a cluster-offset tracking data structure using the region LCN to identify a cluster-offset tracking entry comprising the region LCN and a container offset;
writing, as a session metadata record stored in backup session metadata for the backup session, file metadata describing the file and comprising the container offset; and
transmitting, to a backup target, an information tuple comprising a backup session identifier generated for the backup session, and the backup session metadata.

16. The non-transitory CRM of claim 15, wherein the host file-system supports block cloning.

17. The non-transitory CRM of claim 15, wherein the at least one clone LCN is respectively associated with at least one cloned cluster, and wherein each cloned cluster of the at least one cloned cluster represents a shared logical cluster.

18. The non-transitory CRM of claim 17, wherein the shared logical cluster references host storage space in host storage that maps to at least one file region of a group of file regions comprising the file region of the file and a second file region of the file, and the file region of the file and a second file region of a second file managed by the host file-system.

19. The non-transitory CRM of claim 15, the method further comprising:
receiving, to initiate a recovery session following a data loss, a file-system recovery instruction comprising the backup session identifier;
receiving, from the backup target and in response to transmission thereto of a metadata request comprising the backup session identifier, the backup session metadata associated with the backup session identifier;
extracting, from the session metadata record for the file in the backup session metadata, the container offset mapped to the file region of the file;
based on a second determination that an offset-offset tracking data structure comprises an offset-offset tracking entry comprising the container offset and a storage offset:
locating, mapped to at least the file region of the file, file content stored in host storage at the storage offset;
copying the file content to obtain a file content copy;
identifying a new storage offset initially referencing unoccupied host storage space in the host storage; and
writing, to recover at least a portion of the data loss, the file content copy in the host storage at the new storage offset.

20. A system, comprising:
a backup target; and
a host device operatively connected to the backup target, and comprising:
host storage configured to store data mapped to files;
a computer processor operatively connected to the host storage; and
a host file-system operating on the computer processor and configured to manage the files,
wherein the computer processor is configured to perform a method for efficient file-based backups and recoveries, the method comprising:
receiving, to initiate a backup session, a file-system backup instruction identifying the host file-system;
obtaining at least one clone logical cluster number (LCN) corresponding to a file of the files managed by the host file-system, and a region LCN corresponding to a file region of the file;
based on a determination that the region LCN matches a clone LCN of the at least one clone LCN:
querying a cluster-offset tracking data structure using the region LCN to identify a cluster-offset tracking entry comprising the region LCN and a container offset;
writing, as a session metadata record stored in backup session metadata for the backup session, file metadata describing the file and comprising the container offset; and
transmitting, to the backup target, an information tuple comprising a backup session identifier generated for the backup session, and the backup session metadata.

* * * * *